(12) United States Patent
Kitani

(10) Patent No.: US 6,712,467 B1
(45) Date of Patent: Mar. 30, 2004

(54) PROGRESSIVE-POWER LENS AND DESIGN PROCESS FOR SAME

(75) Inventor: Akira Kitani, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/868,726

(22) PCT Filed: Apr. 12, 2000

(86) PCT No.: PCT/JP00/02365

§ 371 (c)(1), (2), (4) Date: Jun. 21, 2001

(87) PCT Pub. No.: WO00/62116

PCT Pub. Date: Oct. 19, 2000

(30) Foreign Application Priority Data

Apr. 13, 1999 (JP) .............................. 11-105858

(51) Int. Cl.$^7$ ................................. G02C 7/06
(52) U.S. Cl. ....................... 351/169; 351/177
(58) Field of Search ................. 351/169, 177, 351/168, 170, 171, 172

(56) References Cited

U.S. PATENT DOCUMENTS

| | | | | |
|---|---|---|---|---|
| 4,606,622 A | * | 8/1986 | Fueter et al. | 351/169 |
| 5,708,492 A | * | 1/1998 | Kitani | 351/169 |
| 5,719,657 A | | 2/1998 | Izawa et al. | 351/169 |
| 2001/0030735 A1 | * | 10/2001 | Yamamoto | 351/169 |

FOREIGN PATENT DOCUMENTS

| | | |
|---|---|---|
| JP | A 47-23943 | 10/1972 |
| JP | A 56-78817 | 6/1981 |
| JP | S57-170627 | 9/1982 |
| JP | A 57-170672 | 10/1982 |
| JP | A 4-500870 | 2/1992 |
| JP | A 6-18823 | 1/1994 |
| JP | A 8-136868 | 5/1996 |
| JP | A 8-220489 | 8/1996 |

OTHER PUBLICATIONS

Chinese Office Action dated Apr. 4, 2003 (English translation).

* cited by examiner

Primary Examiner—Jordan M. Schwartz
(74) Attorney, Agent, or Firm—Oliff & Berridge PLC

(57) ABSTRACT

The present invention provides a progressive-power lens affording superior wear comfort, even where a shallow base curve is employed in order to make the lens lighter and thinner, which is desirable in the terms of weight and aesthetic design. In the case of a progressive-power lens for correcting hyperopia whose distance portion has a positive refractive power, such lens is designed by giving preference to minimizing transmission astigmatism at each point on the principal sight line of the distance portion, but not giving preference to making the astigmatism of the lens surface zero at each point on the principal sight line. On the other hand, in the case of a myopia corrective progressive-power lens for correcting myopia whose distance portion has a negative refractive power, such lens is designed by giving preference to minimizing transmission average refractive power error at each point on the principal sight line of the distance portion, but not to making the astigmatism of lens surface zero at each point on the principal sight line.

14 Claims, 21 Drawing Sheets

FIG.6

| | -35.0 | -30.0 | -25.0 | -20.0 | -15.0 | -10.0 | -5.0 | 0.0 | 5.0 | 10.0 | 15.0 | 20.0 | 25.0 | 30.0 | 35.0 |
|---|---|---|---|---|---|---|---|---|---|---|---|---|---|---|---|
| 35.0 | | | | | | | | | | | | | | | |
| 30.0 | | | | | | | | 7.52 | | | | | | | |
| 25.0 | | | | | 6.90 | 6.09 | 5.61 | 5.46 | 5.61 | 6.09 | 6.90 | | | | |
| 20.0 | | | | 6.28 | 4.87 | 3.77 | 3.91 | 3.75 | 3.91 | 4.37 | 5.16 | 6.28 | | | |
| 15.0 | | | 6.30 | 4.87 | 3.78 | 2.70 | 2.99 | 2.39 | 2.54 | 2.99 | 3.77 | 4.87 | 6.30 | | |
| 10.0 | | | 5.20 | 3.78 | 2.70 | 1.94 | 1.94 | 1.34 | 1.49 | 1.94 | 2.70 | 3.78 | 5.20 | | |
| 5.0 | | | 4.42 | 3.01 | 1.94 | 1.19 | 1.19 | 0.60 | 0.74 | 1.19 | 1.94 | 3.01 | 4.42 | | |
| 0.0 | 7.78 | 5.94 | 4.17 | 2.73 | 1.61 | 0.74 | 0.74 | 0.15 | 0.30 | 0.74 | 1.50 | 2.57 | 3.98 | 5.73 | |
| -5.0 | | 5.65 | 3.89 | 2.48 | 1.39 | 0.61 | 0.30 | 0.00 | 0.15 | 0.61 | 1.39 | 2.47 | 3.89 | 5.65 | 7.78 |
| -10.0 | | 5.95 | 4.17 | 2.73 | 1.61 | 0.82 | 0.33 | 0.16 | 0.32 | 0.80 | 1.60 | 2.72 | 4.16 | 5.94 | |
| -15.0 | | 6.61 | 4.80 | 3.33 | 2.18 | 1.35 | 0.85 | 0.62 | 0.81 | 1.32 | 2.16 | 3.32 | 4.80 | 6.61 | |
| -20.0 | | 7.66 | 5.81 | 4.30 | 3.11 | 2.24 | 1.70 | 1.50 | 1.67 | 2.20 | 3.07 | 4.27 | 5.80 | 7.66 | |
| -25.0 | | | 7.19 | 5.63 | 4.40 | 3.50 | 2.94 | 2.74 | 2.91 | 3.45 | 4.38 | 5.60 | 7.18 | | |
| -30.0 | | | | 7.36 | 6.09 | 5.16 | 4.59 | 4.39 | 4.56 | 5.11 | 6.04 | 7.33 | | | |
| -35.0 | | | | | | 8.21 | 7.25 | 6.66 | 6.46 | 6.64 | 7.21 | 8.17 | | | |
|  | | | | | | | | 9.00 | | | | | | | |

UNITS : mm

HORIZONTAL AXIS PLUS SIDE IS NASAL SIDE, VERTICAL AXIS PLUS SIDE IS TOP

LENS SURFACE DESIGN DATA (FOR FIG.1A)

[DISTANCE-VISION POWER : S+2.25 DIOPTERS
BASE CURVE : 6.25 DIOPTERS
ADDITION : 2.00 DIOPTERS]

FIG.7

| | -35.0 | -30.0 | -25.0 | -20.0 | -15.0 | -10.0 | -5.0 | 0.0 | 5.0 | 10.0 | 15.0 | 20.0 | 25.0 | 30.0 | 35.0 |
|---|---|---|---|---|---|---|---|---|---|---|---|---|---|---|---|
| 35.0 | | | | | | | | | | | | | | | |
| 30.0 | | | | | | | | 4.21 | | | | | | | |
| 25.0 | | | | | 3.88 | 3.43 | 3.17 | 3.08 | 3.17 | 3.43 | 3.88 | | | | |
| 20.0 | | | | 3.55 | 2.92 | 2.48 | 2.22 | 2.14 | 2.22 | 2.48 | 2.92 | 3.55 | | | |
| 15.0 | | | 3.57 | 2.76 | 2.16 | 1.71 | 1.45 | 1.37 | 1.45 | 1.71 | 2.16 | 2.76 | 3.57 | | |
| 10.0 | | | 2.96 | 2.16 | 1.55 | 1.11 | 0.86 | 0.77 | 0.86 | 1.11 | 1.55 | 2.16 | 2.96 | | |
| 5.0 | | 3.94 | 2.53 | 1.73 | 1.12 | 0.68 | 0.43 | 0.35 | 0.43 | 0.68 | 1.12 | 1.73 | 2.53 | 3.94 | |
| 0.0 | | 3.51 | 2.29 | 1.49 | 0.87 | 0.43 | 0.17 | 0.09 | 0.17 | 0.43 | 0.87 | 1.49 | 2.29 | 3.51 | |
| -5.0 | | 3.28 | 2.26 | 1.45 | 0.82 | 0.37 | 0.09 | 0.00 | 0.10 | 0.37 | 0.82 | 1.45 | 2.26 | 3.28 | |
| -10.0 | | 3.26 | 2.46 | 1.63 | 0.97 | 0.49 | 0.19 | 0.10 | 0.20 | 0.50 | 0.98 | 1.63 | 2.46 | 3.26 | |
| -15.0 | | 3.47 | 2.88 | 2.02 | 1.33 | 0.82 | 0.50 | 0.40 | 0.52 | 0.85 | 1.35 | 2.03 | 2.88 | 3.47 | |
| -20.0 | | 3.90 | 3.51 | 2.62 | 1.90 | 1.37 | 1.03 | 0.93 | 1.07 | 1.41 | 1.94 | 2.65 | 3.52 | 3.90 | |
| -25.0 | | 4.56 | 4.37 | 3.45 | 2.70 | 2.15 | 1.81 | 1.71 | 1.84 | 2.20 | 2.75 | 3.48 | 4.38 | 4.56 | |
| -30.0 | | | | 4.50 | 3.74 | 3.17 | 2.83 | 2.73 | 2.86 | 3.22 | 3.78 | 4.53 | | | |
| -35.0 | | | | | 5.02 | 4.45 | 4.11 | 4.01 | 4.13 | 4.49 | 5.06 | | | | |

5.53

HORIZONTAL AXIS PLUS SIDE IS NASAL SIDE, VERTICAL AXIS PLUS SIDE IS TOP
UNITS : mm

LENS SURFACE DESIGN DATA (FOR FIG.1B)

DISTANCE-VISION POWER : S+2.25 DIOPTERS
BASE CURVE : 3.50 DIOPTERS
ADDITION : 2.00 DIOPTERS

FIG.8

| | -35.0 | -30.0 | -25.0 | -20.0 | -15.0 | -10.0 | -5.0 | 0.0 | 5.0 | 10.0 | 15.0 | 20.0 | 25.0 | 30.0 | 35.0 |
|---|---|---|---|---|---|---|---|---|---|---|---|---|---|---|---|
| 35.0 | | | | | | | | | | | | | | | |
| 30.0 | | | | | | | | 3.99 | | | | | | | |
| 25.0 | | | | | 3.72 | 3.30 | 3.06 | 2.98 | 3.06 | 3.30 | 3.72 | | | | |
| 20.0 | | | | 3.43 | 2.85 | 2.43 | 2.18 | 2.10 | 2.18 | 2.43 | 2.85 | 3.43 | | | |
| 15.0 | | | 3.47 | 2.71 | 2.12 | 1.70 | 1.45 | 1.37 | 1.45 | 1.70 | 2.12 | 2.71 | 3.47 | | |
| 10.0 | | | 2.91 | 2.15 | 1.55 | 1.13 | 0.87 | 0.79 | 0.87 | 1.13 | 1.55 | 2.15 | 2.91 | 3.84 | |
| 5.0 | | | 2.51 | 1.74 | 1.14 | 0.71 | 0.45 | 0.36 | 0.45 | 0.71 | 1.14 | 1.74 | 2.51 | 3.45 | |
| 0.0 | | | 2.29 | 1.50 | 0.89 | 0.45 | 0.19 | 0.10 | 0.19 | 0.45 | 0.89 | 1.50 | 2.29 | 3.24 | |
| -5.0 | | 4.37 | 2.27 | 1.47 | 0.84 | 0.38 | 0.10 | 0.00 | 0.10 | 0.38 | 0.84 | 1.47 | 2.27 | 3.24 | 4.37 |
| -10.0 | | | 2.47 | 1.65 | 1.00 | 0.51 | 0.21 | 0.10 | 0.20 | 0.50 | 0.99 | 1.65 | 2.47 | 3.45 | |
| -15.0 | | | 2.89 | 2.05 | 1.37 | 0.86 | 0.53 | 0.41 | 0.51 | 0.83 | 1.35 | 2.04 | 2.89 | 3.89 | |
| -20.0 | | | 3.52 | 2.66 | 1.96 | 1.43 | 1.08 | 0.95 | 1.05 | 1.38 | 1.92 | 2.64 | 3.52 | 4.54 | |
| -25.0 | | | 4.37 | 3.49 | 2.76 | 2.21 | 1.86 | 1.73 | 1.83 | 2.17 | 2.72 | 3.46 | 4.36 | | |
| -30.0 | | | | 4.53 | 3.79 | 3.23 | 2.88 | 2.75 | 2.85 | 3.19 | 3.75 | 4.50 | | | |
| -35.0 | | | | | 5.05 | 4.49 | 4.14 | 4.02 | 4.12 | 4.45 | 5.01 | | | | |
| | | | | | | | | 5.52 | | | | | | | |

UNITS : mm

HORIZONTAL AXIS PLUS SIDE IS NASAL SIDE, VERTICAL AXIS PLUS SIDE IS TOP

LENS SURFACE DESIGN DATA (FOR FIG.1C)

DISTANCE-VISION POWER ; S+2.25 DIOPTERS
BASE CURVE ; 3.50 DIOPTERS
ADDITION ; 2.00 DIOPTERS

FIG.9

| | -35.0 | -30.0 | -25.0 | -20.0 | -15.0 | -10.0 | -5.0 | 0.0 | 5.0 | 10.0 | 15.0 | 20.0 | 25.0 | 30.0 | 35.0 |
|---|---|---|---|---|---|---|---|---|---|---|---|---|---|---|---|
| 35.0 | | | | | | | | | | | | | | | |
| 30.0 | | | | | | | | 4.86 | | | | | | | |
| 25.0 | | | | | 4.48 | 3.96 | 3.66 | 3.56 | 3.66 | 3.96 | 4.48 | | | | |
| 20.0 | | | | 4.09 | 3.37 | 2.86 | 2.56 | 2.47 | 2.56 | 2.86 | 3.37 | 4.09 | | | |
| 15.0 | | | 4.12 | 3.19 | 2.48 | 1.78 | 1.28 | 1.58 | 1.88 | 2.48 | 3.19 | 4.12 | | | |
| 10.0 | | | 4.55 | 3.41 | 2.49 | 1.78 | 0.99 | 0.89 | 0.99 | 1.29 | 1.78 | 2.49 | 3.41 | 4.55 | |
| 5.0 | | | 4.05 | 2.91 | 1.99 | 1.29 | 0.79 | 0.40 | 0.50 | 0.79 | 1.29 | 1.99 | 2.91 | 4.05 | |
| 0.0 | | | 3.78 | 2.64 | 1.71 | 1.00 | 0.50 | 0.10 | 0.20 | 0.50 | 1.00 | 1.71 | 2.64 | 3.78 | |
| -5.0 | | 5.11 | 3.75 | 2.60 | 1.67 | 0.94 | 0.42 | 0.00 | 0.10 | 0.42 | 0.94 | 1.66 | 2.60 | 3.75 | 5.11 |
| -10.0 | | | 3.97 | 2.81 | 1.86 | 1.11 | 0.57 | 0.20 | 0.22 | 0.56 | 1.10 | 1.85 | 2.81 | 3.97 | |
| -15.0 | | | 4.44 | 3.27 | 2.30 | 1.52 | 0.95 | 0.45 | 0.57 | 0.93 | 1.51 | 2.29 | 3.27 | 4.44 | |
| -20.0 | | 5.17 | 3.98 | 2.98 | 2.18 | 1.59 | 1.05 | 1.05 | 1.17 | 1.55 | 2.15 | 2.98 | 3.97 | 5.17 | |
| -25.0 | | | 4.94 | 3.91 | 3.08 | 2.46 | 1.93 | 1.93 | 2.04 | 2.43 | 3.05 | 3.89 | 4.93 | | |
| -30.0 | | | 5.11 | 4.25 | 3.62 | 3.22 | 3.08 | 3.08 | 3.20 | 3.58 | 4.21 | 5.08 | | | |
| -35.0 | | | | 5.69 | 5.05 | 4.85 | 4.51 | 4.51 | 4.63 | 5.01 | 5.66 | | | | |

UNITS : mm
HORIZONTAL AXIS PLUS SIDE IS NASAL SIDE, VERTICAL AXIS PLUS SIDE IS TOP

LENS SURFACE DESIGN
DATA (FOR FIG.2A)

[DISTANCE-VISION POWER ; S–5.00 DIOPTERS
BASE CURVE ; 4.00 DIOPTERS
ADDITION ; 2.00 DIOPTERS]

FIG.10

| | -35.0 | -30.0 | -25.0 | -20.0 | -15.0 | -10.0 | -5.0 | 0.0 | 5.0 | 10.0 | 15.0 | 20.0 | 25.0 | 30.0 | 35.0 |
|---|---|---|---|---|---|---|---|---|---|---|---|---|---|---|---|
| 35.0 | | | | | | | | | | | | | | | |
| 30.0 | | | | | | | | 2.46 | | | | | | | |
| 25.0 | | | | | 2.28 | 2.02 | 1.86 | 1.81 | 1.86 | 2.02 | 2.28 | | | | |
| 20.0 | | | | 2.09 | 1.72 | 1.46 | 1.31 | 1.26 | 1.31 | 1.46 | 1.72 | 2.09 | | | |
| 15.0 | | | 2.12 | 1.64 | 1.27 | 1.01 | 0.86 | 0.81 | 0.86 | 1.01 | 1.27 | 1.64 | 2.12 | | |
| 10.0 | | | 1.76 | 1.28 | 0.92 | 0.66 | 0.51 | 0.46 | 0.51 | 0.66 | 0.92 | 1.28 | 1.76 | | |
| 5.0 | | | 1.51 | 1.03 | 0.67 | 0.41 | 0.26 | 0.21 | 0.26 | 0.41 | 0.67 | 1.03 | 1.51 | | |
| 0.0 | | | 1.38 | 0.90 | 0.53 | 0.26 | 0.11 | 0.05 | 0.11 | 0.26 | 0.52 | 0.90 | 1.38 | | |
| -5.0 | | 1.98 | 1.39 | 0.90 | 0.51 | 0.23 | 0.06 | 0.00 | 0.06 | 0.23 | 0.51 | 0.90 | 1.39 | 1.99 | |
| -10.0 | | 2.16 | 1.55 | 1.04 | 0.63 | 0.32 | 0.13 | 0.06 | 0.13 | 0.32 | 0.63 | 1.04 | 1.55 | 2.16 | |
| -15.0 | | 2.47 | 1.85 | 1.33 | 0.90 | 0.57 | 0.35 | 0.14 | 0.33 | 0.55 | 0.88 | 1.32 | 1.85 | 2.47 | |
| -20.0 | | 2.94 | 2.31 | 1.76 | 1.31 | 0.96 | 0.72 | 0.62 | 0.69 | 0.92 | 1.28 | 1.75 | 2.30 | 2.94 | |
| -25.0 | | | 2.91 | 2.34 | 1.86 | 1.49 | 1.25 | 1.15 | 1.22 | 1.46 | 1.83 | 2.32 | 2.90 | | |
| -30.0 | | | 3.05 | 2.57 | 2.19 | 1.95 | 1.86 | 1.92 | 2.16 | 2.53 | 3.04 | | | | |
| -35.0 | | | | 3.44 | 3.05 | 2.81 | 2.72 | 2.79 | 3.02 | 3.40 | | | | | |
| | | | | | | | | 3.75 | | | | | | | |

LENS SURFACE DESIGN DATA (FOR FIG.2B)

DISTANCE-VISION POWER : S-5.00 DIOPTERS
BASE CURVE : 2.00 DIOPTERS
ADDITION : 2.00 DIOPTERS

UNITS : mm

HORIZONTAL AXIS PLUS SIDE IS NASAL SIDE, VERTICAL AXIS PLUS SIDE IS TOP

FIG.11

| | -35.0 | -30.0 | -25.0 | -20.0 | -15.0 | -10.0 | -5.0 | 0.0 | 5.0 | 10.0 | 15.0 | 20.0 | 25.0 | 30.0 | 35.0 |
|---|---|---|---|---|---|---|---|---|---|---|---|---|---|---|---|
| 35.0 | | | | | | | | | | | | | | | |
| 30.0 | | | | | | | | 2.57 | | | | | | | |
| 25.0 | | | | | 2.37 | 2.09 | 1.88 | 1.93 | 2.09 | 2.37 | | | | | |
| 20.0 | | | | 2.16 | 1.78 | 1.51 | 1.35 | 1.30 | 1.35 | 1.51 | 1.78 | 2.16 | | | |
| 15.0 | | | 2.17 | 1.68 | 1.30 | 0.93 | 0.67 | 0.83 | 0.88 | 1.03 | 1.30 | 1.68 | 2.17 | | |
| 10.0 | | | 2.41 | 1.79 | 1.30 | 0.93 | 0.67 | 0.47 | 0.52 | 0.67 | 0.93 | 1.30 | 1.79 | 2.41 | |
| 5.0 | | | 2.14 | 1.53 | 1.04 | 0.66 | 0.41 | 0.21 | 0.26 | 0.41 | 0.66 | 1.04 | 1.53 | 2.14 | |
| 0.0 | | | 2.00 | 1.38 | 0.89 | 0.52 | 0.26 | 0.06 | 0.10 | 0.26 | 0.52 | 0.89 | 1.38 | 2.00 | |
| -5.0 | | 2.74 | 2.00 | 1.39 | 0.89 | 0.50 | 0.23 | 0.00 | 0.06 | 0.22 | 0.50 | 0.88 | 1.39 | 2.00 | 2.74 |
| -10.0 | | | 2.16 | 1.54 | 1.02 | 0.62 | 0.32 | 0.06 | 0.12 | 0.31 | 0.61 | 1.02 | 1.54 | 2.16 | |
| -15.0 | | | 2.48 | 1.84 | 1.31 | 0.88 | 0.55 | 0.25 | 0.32 | 0.53 | 0.86 | 1.30 | 1.84 | 2.48 | |
| -20.0 | | | 2.95 | 2.30 | 1.74 | 1.29 | 0.94 | 0.61 | 0.67 | 0.90 | 1.26 | 1.73 | 2.29 | 2.95 | |
| -25.0 | | | | 2.90 | 2.32 | 1.84 | 1.47 | 1.13 | 1.20 | 1.43 | 1.81 | 2.30 | 2.90 | | |
| -30.0 | | | | 3.06 | 2.55 | 2.17 | 1.92 | 1.83 | 1.90 | 2.13 | 2.52 | 3.03 | | | |
| -35.0 | | | | | 3.43 | 3.04 | 2.79 | 2.70 | 2.77 | 3.00 | 3.40 | | | | |

(at col 0.0, row -35.0: 3.75)

HORIZONTAL AXIS PLUS SIDE IS NASAL SIDE, VERTICAL AXIS PLUS SIDE IS TOP

UNITS : mm

TRANSMISSION DESIGN DATA (FOR FIG.2C)

| DISTANCE-VISION POWER | S-5.00 DIOPTERS |
| BASE CURVE | 2.00 DIOPTERS |
| ADDITION | 2.00 DIOPTERS |

ORDERING AND INQUIRY SCREEN

| CUSTOMER NUMBER : | ****** | | | | | | | |
|---|---|---|---|---|---|---|---|---|
| INTIAL VISIT DATA : | //1998 | | | | | | | |
| NAME : | HOYA TARO | (MALE) | (FEMALE) | | | | | |
| DISTANCE PD : | R: | mm | NEAR PD : | R: | – | | | |
| | L: | mm | | L: | – | | | |
| EYE POINT HEIGHT : | R: | mm | SEGMENT HEIGHT : | R: | – | EDGE THICKNESS SPECIFICATION : | R: | – |
| | L: | mm | | L: | – | | L: | – |
| DISTANCE VR VALUE : | R: | mm | CO VALUE= mm | | CR VALUE= mm | | VC VALUE= | mm |
| | L: | mm | CO VALUE= mm | | CR VALUE= mm | | VC VALUE= | mm |
| NEAR VR VALUE : | R: | mm | CO VALUE= mm | | CR VALUE= mm | | VC VALUE= | mm |
| | L: | mm | CO VALUE= mm | | CR VALUE= mm | | VC VALUE= | mm |

LENS INFORMATION

| INDIVIDUAL DESIGN LENS NAME : | SPRX-W |
|---|---|

FRAME INFORMATION

| MANUFACTURER NAME | |
|---|---|
| MODEL | |
| FRAME FORWARD TILT ANGLE | |

POWER INFORMATION

| | SPH | CYL | AX | ADD | PROCESSING SPECIFICATION | | | |
|---|---|---|---|---|---|---|---|---|
| R | | | | | | | | |
| L | | | | | | | | |

θ = FRAME FORWARD TILT ANGLE

PROGRESSIVE-POWER LENS AND DESIGN PROCESS FOR SAME

TECHNICAL FIELD

The present invention relates to a progressive-power lens (progressive multifocal lens) for use in spectacles for both near and far use, and more particularly to a progressive-power lens affording comfortable wear even when the curve of the lens is shallow, and to a design process therefor.

BACKGROUND ART

Spectacles with progressive-power lenses that function as spectacles for both near and far use are used in cases where the ability of the eyes to adjust has diminished due to presbyopia, for example. A progressive-power lens comprises an upper far zone for distance vision and a lower near zone for near vision. The intermediate portion between the far zone and near zone is for intermediate vision.

Typically, of the two faces, namely front and back faces of a progressive-power lens, the front face, directed towards objects, is the progressive face on which the refractive power (hereinbelow, refractive power is occasionally referred to as "power") changes progressively, and the back face, directed towards the eyes, is of relatively simple prescription, for example, spherical or astigmatic. The surface refractive power of the distance portion on the progressive face is termed the "base curve" and is used as a reference face when designing the progressive face. Accordingly, progressive faces with substantially identical progressive characteristics can be obtained with different base curves, at least insofar as surface refractive power is concerned. Typically, a deeper base curve (i.e., a smaller radius of curvature on the curving face) is associated with greater center thickness in a (+) lens, or with greater edge thickness in a (−) lens. Conversely, a shallower base curve allows the lens to be made thinner, but presents certain disadvantages in terms of power (transmission power) and aberration (transmission aberration).

When the eye travels from a visual target at infinite distance ahead to a visual target closer ahead, wearing these spectacles, a continuous line of the set of points of intersection of the line of vision with the lens can be assumed. This line is typically termed the "principal sight line," "principal meridonal line," or "center reference line," It is a line that extends vertically through the center of the lens so as to divide it into substantially left and right portions; of the front and back faces of the lens, the line is defined on the progressive face where progressive action is present.

The assessment of a progressive-power lens is typically performed in terms of analysis of the level of error in refractive power and/or the level of astigmatism along the principal sight line, as well as the refractive power error distribution and astigmatism distribution in the zones to the left and right of the principal sight line, etc. The criteria for conventional evaluation generally dictate that astigmatism on the principal sight line be zero. That is, there is a series of minute spherical faces on the principal sight line; such a principal sight line is sometimes termed a "umbilical curvature."

Even if it is possible to eliminate the refractive power error or astigmatism of a spectacle lens per se in an ideal manner, this will not necessarily make it possible to eliminate aberrations such as astigmatism, curvature of field, etc., which are caused in an image produced in the eye when the spectacle lens is worn. It is assumed that the quality of sight which is obtained by wearing spectacles is determined, after all, by such aberrations of the intraocular and not solely by the optical characteristics of the lens surface. In other words, aberrations in intraocular image and the like are also affected by various factors including the position on the lens through which the line of sight passes, the distance from the lens to the center of rotation of the eye, the refractive power of the ocular lens, and the angle of rotation of the eye. Accordingly, there will be cases when, even if the astigmatism on the lens surface is zero, the astigmatism of the intraocular image obtained when the lens is worn will not be zero. Conversely, it will also be found that, when attempts are made to obtain zero aberration of intraocular image, the astigmatism on the lens surface will assume a value other than zero.

Japanese Patent Publication S47-23943 discloses a method for improving astigmatism and aberration (e.g., curvature of field, distortion, etc.) in distance vision, intermediate vision, and near vision with spectacle wear. Where the correction affording the improvement is implemented on the progressive face, surface astigmatism along the principal sight line on the progressive face is not zero; in other words, this progressive-power lens has a so-called "non-umbilical curvature" portion.

In Japanese Patent Applications Laid-Open (JP-A) S56-78817, Japanese PCT Patent Application Laid-Open H4-500870, JP-A H6-18823, JP-A H8-136868, Patent Application S57-170627 and the four divisional applications thereof, and elsewhere are disclosed inventions purporting to improve astigmatism during spectacle wear.

These publications suggest that, when the surface curve of a spectacle lens is designed, it is necessary to take into consideration the astigmatism of intraocular image, etc. observed when spectacles are worn. However, research carried out by the inventors of the present invention has shown that the plurality of error factors such as astigmatism, etc. occurring with spectacle wear include factors which cancel each other out, and that good results cannot be obtained through the simple approach of minimizing the respective error factors.

With respect to this point, during wear of the aforementioned progressive-power lens, where the intraocular image of an object point viewed through an arbitrary location on the spectacle lens is not focused at a single point, but rather imaged as two line segments separated by an interval, let the difference of the two refractive powers for these two focal locations be defined as transmission astigmatism at the aforesaid location on the spectacle lens; and let the difference between the average value of refractive powers for the two focal locations and the refractive power for the correct focal location be defined as the transmission average refractive power error (curvature of field). Where correction is performed, for example, so as to simply minimize the astigmatism in intraocular image (i.e., transmission astigmatism) in the principal zone of the lens, or at least in the principal zone on the principal sight line, the error resulting from focusing of the image at a location diverging from the correct focal location in the eye (i.e., transmission average refractive power error) will increase, and this will often result in decreasing the wear comfort.

Accordingly, it is important, when designing a lens, to consider the balance between the astigmatism and the transmission average refractive power error. However, it has been found that an ideal balance cannot be achieved by such a simple approach as to make these two equivalent in the principal zone of the lens. Particularly where a shallow base curve is employed in order to make the lens lighter and thinner, the distance between the eye and the distance portion increases, as does the angle of the normal between the visual axis and the lens face, resulting in a marked increase in transmission astigmatism and the transmission average refractive power error. Accordingly, greater correction is required, and this correction has the drawback of creating side effects that can in turn cause aberration to increase.

The present invention was developed with the foregoing in view, and has as an object to provide a progressive-power lens affording superior wear comfort, even where a shallow base curve is employed in order to make the lens lighter and thinner, and a design method for such a lens.

DISCLOSURE OF THE INVENTION

To solve the aforementioned problems, the first invention is a progressive-power lens comprising a distance portion formed in the upper region of the lens; a near portion formed in the lower region of the lens; and an intermediate portion situated in an intermediate portion between said distance portion and near portion; said lens having a refractive power distribution wherein the refractive power of each portion changes progressively going from said distance portion through the intermediate portion to the near portion along a principal sight line that is a center reference line dividing the lens into substantially left and right portions; and said distance portion having a predetermined addition range corresponding to the prescription for correcting hyperopia and that for correcting myopia; wherein, where said lens is for correcting hyperopia, having positive refractive power in said distance portion, the correction provided thereby has the effect of minimizing transmission astigmatism at each point on said principal sight line; and where said lens is for correcting myopia, having negative refractive power in said distance portion, the correction provided thereby has the effect of minimizing the transmission average refractive power error at each point on said principal sight line; and a method for designing such a lens.

The second invention is a progressive-power lens according to the first invention, wherein the correction provided thereby has the effect of minimizing transmission astigmatism at each point on the principal sight line in said near portion, and method for design thereof.

The third invention is a progressive-power lens according to the first invention, wherein the correction provided thereby has the effect of minimizing and transmission average refractive power error at each point on the principal sight line in said near portion, and method for design thereof.

The fourth invention is a progressive-power lens according to the any of the first to third inventions, wherein no such correction is made that transmission astigmatism becomes zero at either the distance reference point or the near reference point, or at both reference points, and method for design thereof.

The inventions having the constitutions described hereinabove are radically different from conventional methods in that ultimate wear comfort has been designed taking into consideration not only the transmission astigmatism and the transmission average refractive power error, but also the accommodating power of the eye with respect thereto. Of the two refractive powers mentioned in the preceding definition of transmission astigmatism, one refractive power is defined as transmission refractive power (power) in the meridional cross section and shall be referred to as transmission meridional refractive power (power), etc., while the other is defined as transmission refractive power (power) in the sagittal cross section, and shall be referred to as transmission sagittal refractive power (power) or sagittal direction transmission refractive power (power), etc.

The above definition is made based on the fact that the principal sight line—the center reference line that divides the lens into substantially left and right portions—extends substantially in the meridional direction and, therefore, in order to simplify the following description, the direction in which the principal sight line extends is referred to as "meridional", while the direction perpendicular thereto is referred to as "sagittal". The two refractive powers of transmission astigmatism in zones other than that on the principal sight line are not necessarily limited to the meridional and sagittal directions.

For example, where transmission astigmatism is present, this cannot be rectified by the accommodating power of the eye (in other words, the effects of transmission astigmatism are in the nature of an absolute value). However, for a transmission average refractive power error (curvature of field), it may be corrected by the accommodating power of the eye, depending on whether the error is positive or negative: an error is positive (+) when the value thereof is larger than the inherent refractive power, and is negative (−) when it is smaller.

Typically, a correct lens power for distance vision is a refractive power that can focus on the retina an image of the object point at a distance of infinity, independently of the accommodating ability of the eye. Accordingly, when an object point at a distance of infinity is viewed wearing a spectacle lens of this power, the ocular lens will be in its thinnest state. As this object point gradually moves from infinity to a position closer to the eyeball, if the ocular lens does not adjust, the focus location of the object point will diverge from the retina so that the image becomes blurred. However, the accommodating ability of the eye works automatically to swell the ocular lens so that the image of the object point remains focused on the retina.

Since the ocular lens is in its thinnest state when viewing a distance independently of the accommodating ability of the eye (with the naked eye), the refractive power of the ocular lens cannot be weakened any more, but it can be strengthened. In other words, during distance vision, the accommodating power of the eye has the effect of increasing the thickness of the ocular lens, or of increasing the refractive power (hereinbelow referred to as "positive (+) effect"), but does not have the effect of decreasing the thickness of the ocular lens, or of decreasing the refractive power of the ocular lens (hereinbelow occasionally referred to as "negative (−) effect").

Accordingly, in the case of distance vision, in the event of error such that average refractive power in transmission deviates towards refractive power that is larger than the original refractive power (hereinbelow referred to as positive (+) transmission average refractive power error), this error cannot be cancelled out by the accommodating power of the eye. However, conversely, in the event of error such that average refractive power in transmission deviates towards refractive power that is lower than the original refractive power (hereinbelow referred to as negative (−) transmission average refractive power error), this error can be cancelled out automatically by the accommodating power of the eye.

Here, let it be assumed that an existing progressive-power lens having a relatively deep base curve is given a shallower base curve in order to make it thinner. In many cases, simply making the base curve thinner will increase transmission astigmatism and transmission average refractive power error, etc. in each portion of the lens. Accordingly, correction is performed so as to minimize this these errors.

One such possible correction is correction performed so as to minimize transmission astigmatism in the distance portion. Where correction performed so as to minimize transmission astigmatism in the distance portion of a lens with positive distance-vision power (a hyperopia corrective lens with a distance portion having positive refractive power), in many cases the average refractive power in transmission will assume a (−) error. However, as noted, this error can be compensated for by the accommodating power of the eye per se provided it is within a predetermined range.

In contrast, correction performed so as to minimize transmission astigmatism in the distance portion of a lens with a negative distance-vision power (a myopia corrective lens with a distance portion having negative refractive power), in many cases the average refractive power in transmission will assume a (+) error. However, as noted, this error cannot be compensated for by the accommodating ability of the eyeball per se. Accordingly, it will be apparent that the method of correction such that transmission astigmatism in the distance portion is minimized, while affording minimization of transmission astigmatism that per se represents an improvement, also creates a new problem of (+) transmission average refractive power error (curvature of field).

To summarize the results of the preceding explication, for a hyperopia corrective lens with a distance portion having positive refractive power, the design will incorporate correction such that transmission astigmatism at each point on the principal sight line is minimized, whereas for a myopia corrective lens with a distance portion having negative refractive power, it will incorporate correction such that transmission average refractive power error at each point on the principal sight line is minimized.

Let us now consider improvements to the near portion. As regards the near portion, preferred practice is to correct so as to minimize transmission astigmatism or correct so as to minimize transmission average refractive power error, regardless of whether the lens is for correcting hyperopia or for correcting myopia. On the one hand, it will be apparent that where correction minimizes transmission astigmatism in the near portion of the aforementioned "progressive-power lens with a shallow base curve," the transmission average refractive power error (curvature of field) in the near portion will be (−) for one with positive distance-vision power and conversely (+) for a negative one.

In other words, this means that for one with positive distance-vision power, addition will act weakly, while for a negative one it will act strongly. Here, where addition is weak, the original function is not adequate, whereas if stronger than needed, the associated distortion will also be stronger than necessary. Accordingly, the choice exists to improve transmission average refractive power error in the distance portion and near portion while leaving transmission astigmatism in the reference points of the distance portion and near portion completely uncorrected.

BRIEF DESCRIPTION OF THE DRAWINGS

FIG. 6 is a diagram showing an example of curving form for the progressive face of the progressive-power lens shown in FIG. 1(A);

FIG. 7 is a diagram showing an example of curving form for the progressive face of the progressive-power lens shown in FIG. 1(B);

FIG. 8 is a diagram showing an example of curving form for the progressive face of the progressive-power lens shown in FIG. 1(C);

FIG. 9 is a diagram showing an example of curving form for the progressive face of the progressive-power lens shown in FIG. 2(A);

FIG. 10 is a diagram showing an example of curving form for the progressive face of the progressive-power lens shown in FIG. 2(B);

FIG. 11 is a diagram showing an example of curving form for the progressive face of the progressive-power lens shown in FIG. 2(C);

FIG. 19 is an illustrative diagram of an ordering screen;

BEST MODE FOR CARRYING OUT THE INVENTION

EMBODIMENT 1

FIGS. 1 to 5 are illustrative diagrams of progressive-power lens groups pertaining to Embodiment 1. The progressive-power lens groups pertaining to Embodiment 1 is described hereinbelow making reference to FIGS. 1 to 5.

Figure 1:
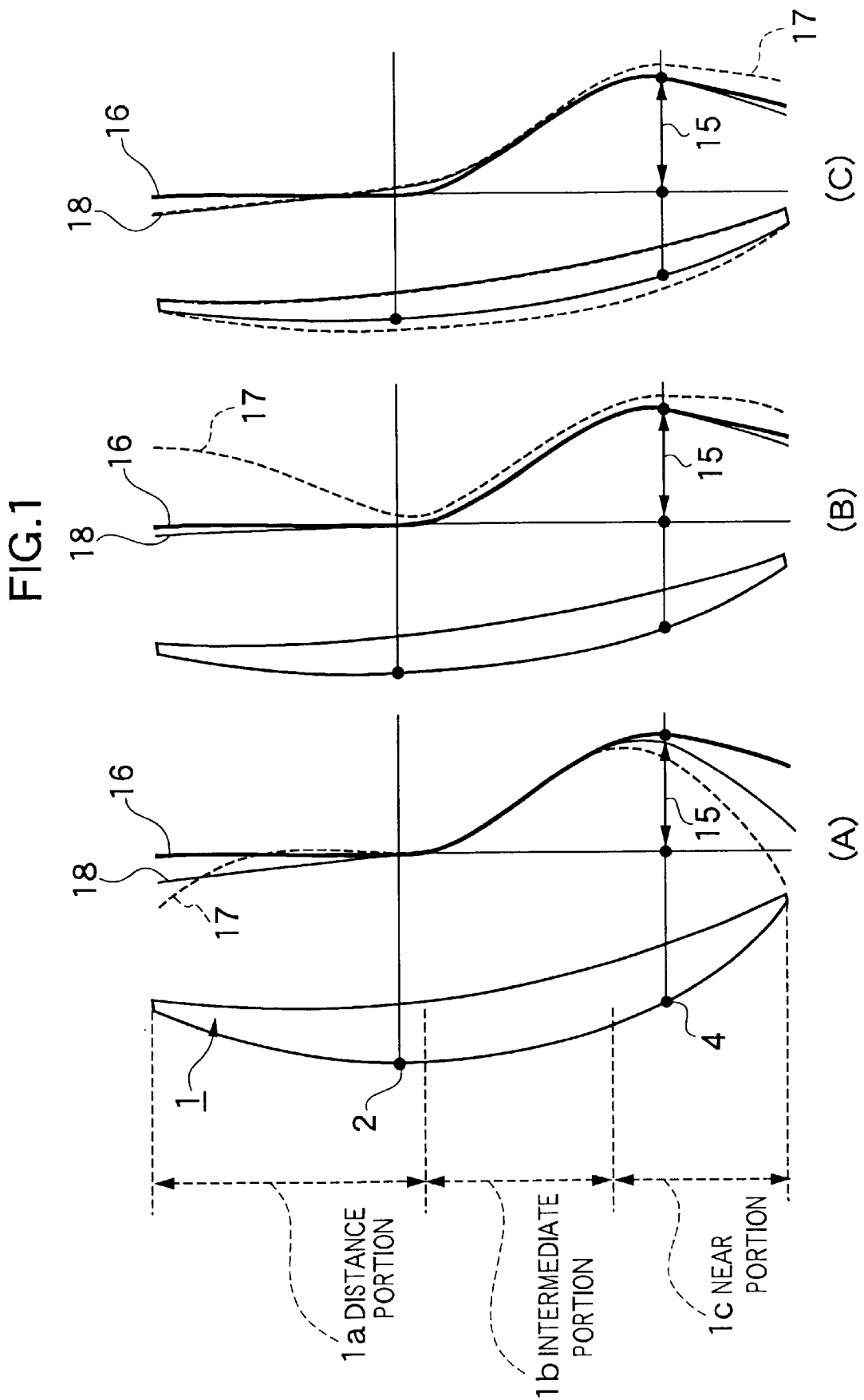
FIG. 1 is a diagram showing a curve of change of transmission refractive power on the principal sight line on a hyperopia corrective progressive-power lens in Embodiment 1, (A) being a diagram showing a curve of change in transmission refractive power for a conventional progressive-power lens having a relatively deep base curve, (B) being a diagram showing a curve of change in transmission refractive power for a progressive-power lens produced by simply making the base curve of the lens of (A) shallower, and (C) being a diagram showing a curve of change in transmission refractive power for a progressive-power lens produced by correcting the lens of (B) through implementation of the invention.
Figure 2:
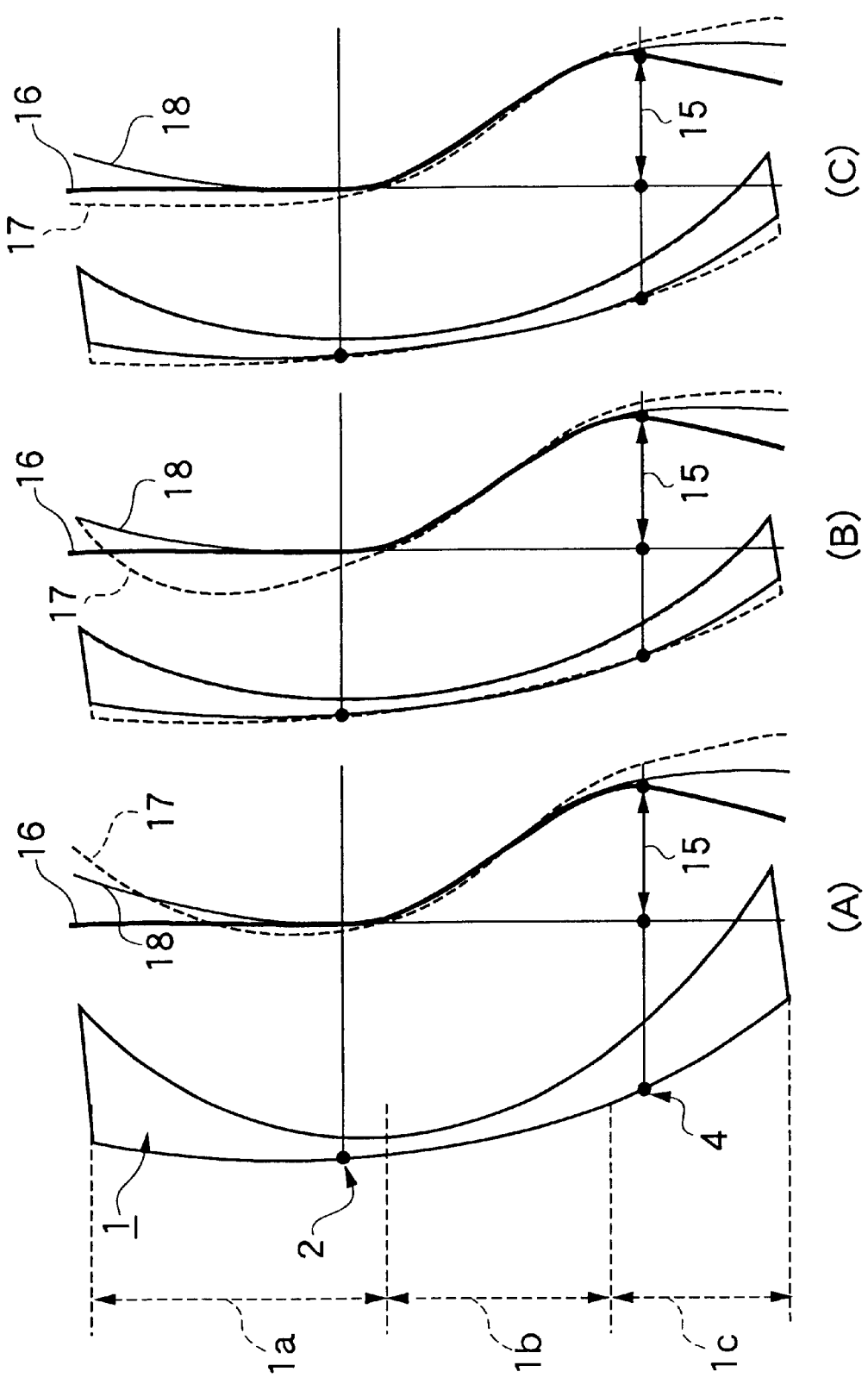
FIG. 2 is a diagram showing a curves of change in a transmission refractive power on the principal sight line on myopia corrective progressive-power lens in Embodiment 1, (A) being a diagram showing a curve of change in transmission refractive power for a conventional progressive-power lens having a relatively deep base curve, (B) being a diagram showing a curve of change in transmission refractive power for a progressive-power lens produced by simply making the base curve of the lens of (A) shallower, and (C) being a diagram showing a curve of change in transmission refractive power for a progressive-power lens produced by correcting the lens of (B) through implementation of the invention.

In each of FIGS. 1 and 2, (A) is a diagram showing a transmission refractive power distribution for a conventional progressive-power lens having a relatively deep base curve; (B) is a diagram showing a transmission refractive power distribution for a progressive-power lens produced by simply making the base curve of the lens of (A) shallower; and (C) is a diagram showing a transmission refractive power distribution for a progressive-power lens produced by correcting the lens of (B) through implementation of the invention. FIG. 1 pertains to a progressive-power lens whose distance portion has positive refractive power (for correction of hyperopia) and FIG. 2 pertains to a progressive-power lens whose distance portion has negative refractive power (for correction of myopia). In the figures, the boundaries between the distance portion, intermediate portion, and near portion are indicated by broken lines for convenience, but this is simply to aid the description; such visibly distinct boundaries would not be present on an actual lens.

Figure 3:
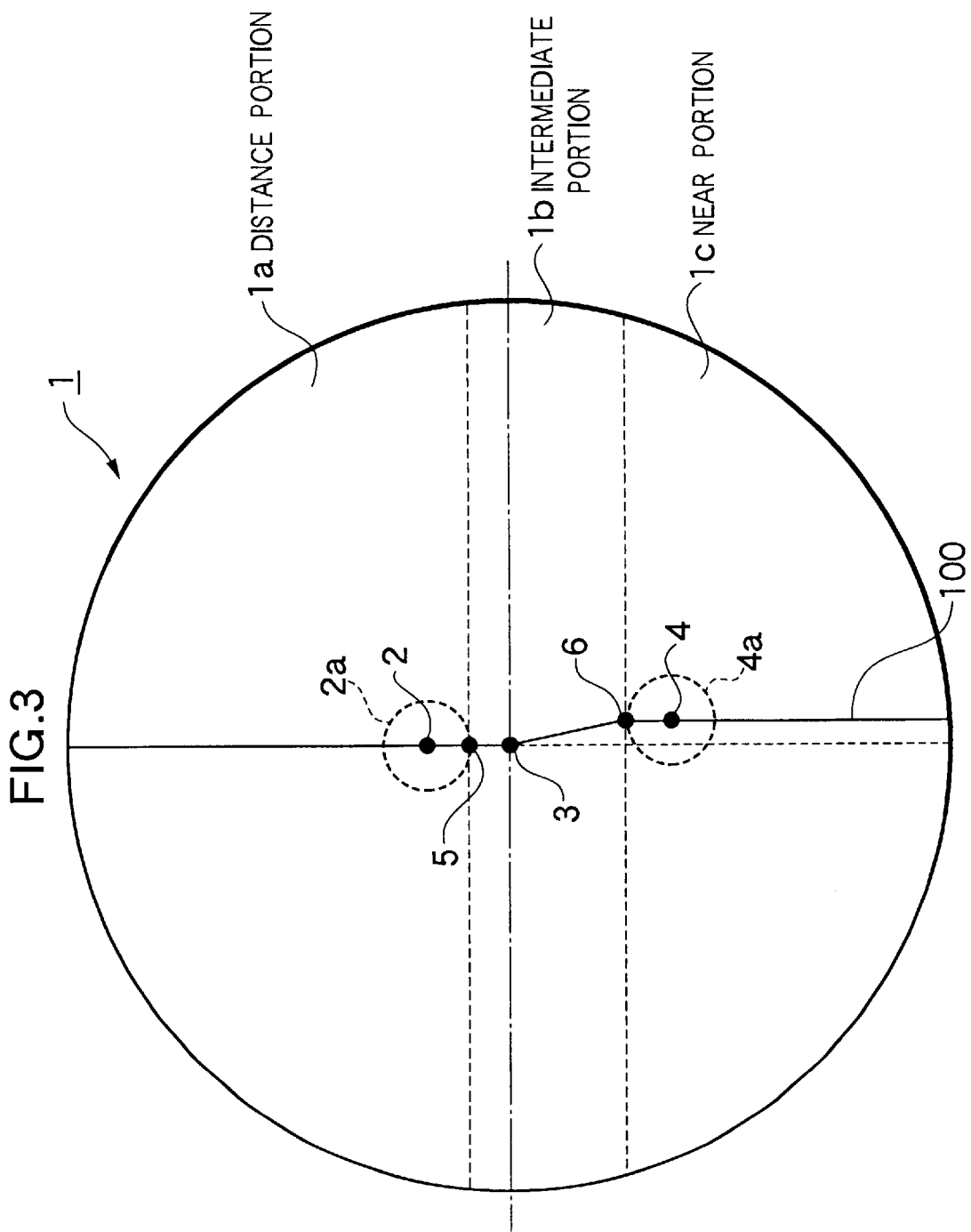
FIG. 3 is a front view of the progressive-power lenses shown in FIG. 1 and FIG. 2.

FIG. 3 is a front view of the progressive-power lenses shown in FIG. 1 and FIG. 2. In FIGS. 1 to 5, symbol 1 indicates the progressive-power lens proper, symbol 1a indicates the distance portion, symbol 1b indicates the intermediate portion, symbol 1c indicates the near portion, symbol 2 indicates the distance reference point, symbol 2a is a broken line circle indicating the distance-vision power measurement zone, symbol 3 is the geometric center of the lens, symbol 4 indicates the near reference point, and symbol 4a is a broken line circle indicating the near-vision power measurement zone. At distance reference point 2, the measured value from the concave face of the lens is the distance-vision power, and the difference between the measured values from the convex face of the lens at distance reference point 2 and near reference point 4 is the addition. Symbol 5 indicates the position of the distance-vision eye point, showing the location where the eye is placed during distance vision, and symbol 6 indicates the position of near-vision eye point, showing the location where the eye is placed during near vision; the gap between the position of distance-vision eye point 5 and the position of near-vision eye point 6 is termed the "progressive corridor length." Symbol 16 indicates a curve showing change in surface average refractive power along the principal sight line 100 of the corresponding progressive-power lens; the difference in surface average refractive power at distance reference point 2 and near reference point 4 is the addition, indicated by symbol 15.

Figure 4:
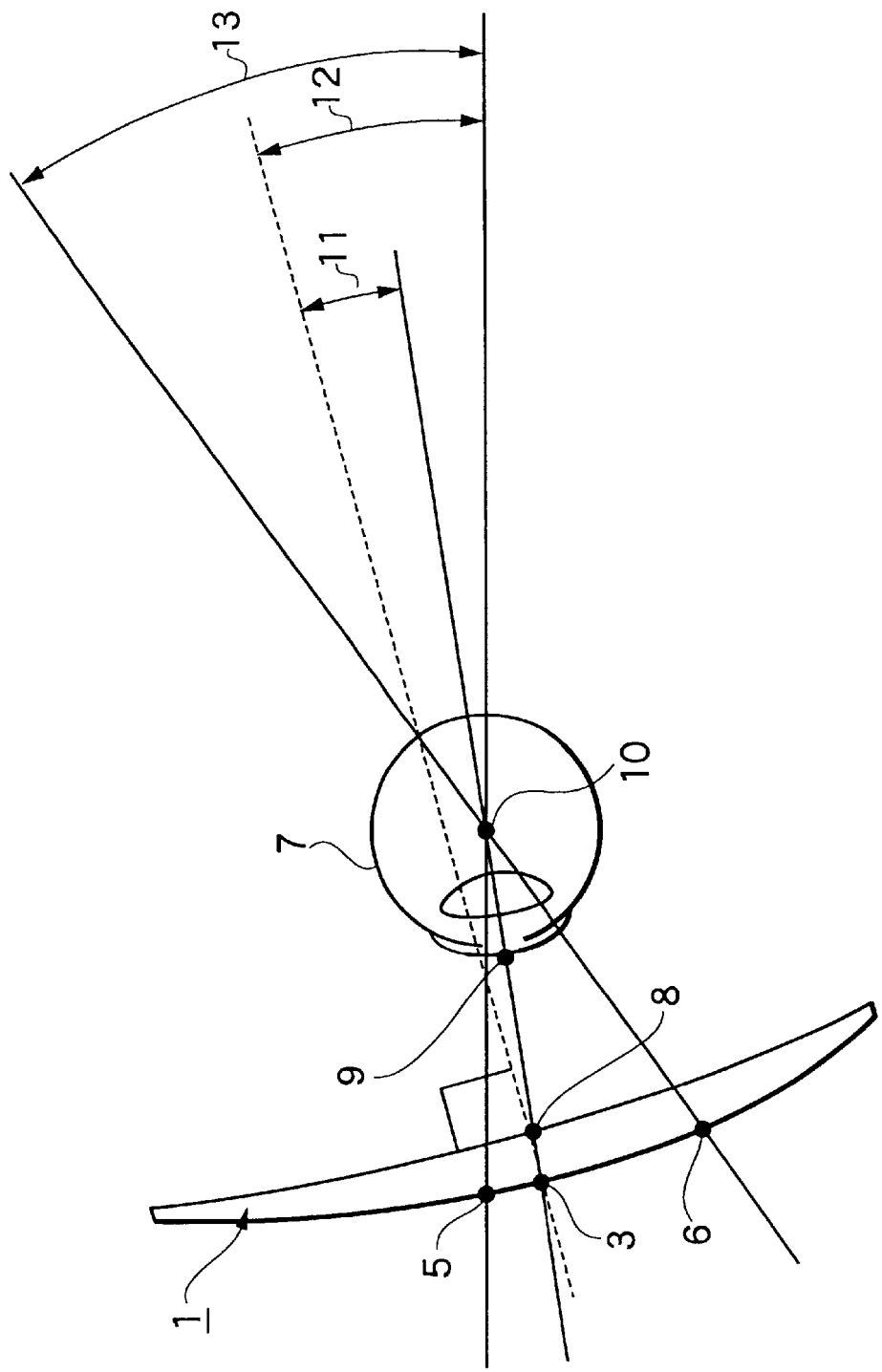
FIG. 4 is a side view illustrating spectacle wear of a progressive-power lens.

Symbols 17 and 18 respectively indicate a change curve of meridional transmission refractive power (17) and a change curve of sagittal transmission refractive power (18) along principal sight line 100 when progressive-power lens 1 is used in the spectacle wear configuration shown in FIG. 4. Accordingly, in FIGS. 1 and 2, the difference in refractive power at each location represented by the change curve of meridional transmission refractive power 17 and the change curve of sagittal transmission refractive power 18 is the transmission astigmatism. Subtracting the surface average refractive power 16 for lens proper 1 from the average value of meridional transmission refractive power and sagittal transmission refractive power at a given location gives transmission refractive power error (curvature of field) for that location.

In FIG. 4, symbol 7 indicates the eyeball, symbol 8 indicates the lens posterior vertex location, symbol 9 indicates the cornea vertex location, symbol 10 indicates the center of rotation of the eye, symbol 11 indicates the angle formed by the geometric center axis of the lens and the line of sight passing through the geometric center of the lens, symbol 12 indicates the angle formed by the geometric center axis of the lens and the line of sight passing through the distance-vision eye point location, and symbol 13 indicates the angle formed by the geometric center axis of the lens and the line of sight passing through the near-vision eye point location. In the spectacle lens configuration of the present embodiment, depicted in FIG. 4, where the angle of symbol 11 is 7°, the angle of symbol 12 is 15°, and the angle of symbol 13 is 30°, the gap between lens posterior vertex location 8 and center of rotation of the eye 10 is (27−D/6.0) mm, where D is the distance-vision power. The upper limit is 28 mm and the lower limit is 26 mm.

Figure 5:
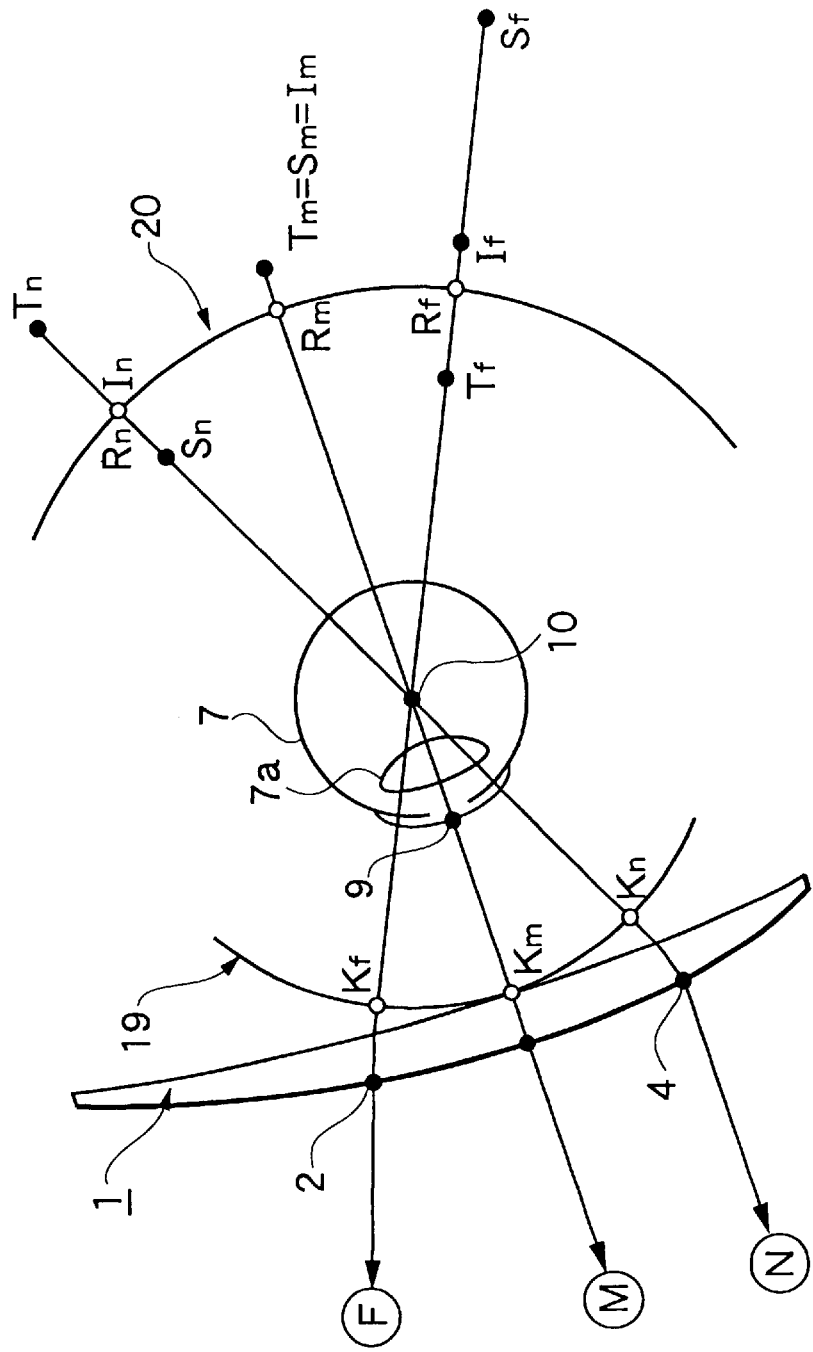
FIG. 5 is a diagram illustrating transmission astigmatism and transmission average refractive power error (curvature of field) with spectacle wear.

FIG. 5 is a diagram illustrating transmission astigmatism and transmission average refractive power error (curvature of field) with wear of the spectacles shown in FIG. 4. The symbols in FIG. 5 are as follows.

Symbols F. M, and N are visual target locations for distance vision, intermediate vision, and near vision, respectively.

Symbols Kf, Km, and Kn are starting points of reckoning for focal point distance of transmitted light for distance vision, intermediate vision, and near vision, respectively.

Symbols Tf, Tm, and Tn are focal point locations of transmission meridional power (transmission refractive power in meridional cross section) for distance vision, intermediate vision, and near vision, respectively.

Symbols Sf, Sm, and Sn are focal point locations of transmission sagittal power (transmission refractive power in sagittal cross section) for distance vision, intermediate vision, and near vision, respectively.

Symbols If, Im, and In are focal point locations of transmission average power for distance vision, intermediate vision, and near vision, respectively.

Symbols Rf, Rm, and Rn are focal point locations of reference power for distance vision, intermediate vision, and near vision, respectively.

Symbol 19 is a starting point of reckoning for focal point distance of transmitted light, centered on the center of rotation of the eye, consisting of a spherical face passing through the lens posterior vertex.

Symbol 20 is an image face showing focal points for reference power corresponding to distance vision, intermediate vision, and near vision (and is not necessarily a spherical face).

In FIG. 5, transmission meridional power for distance vision, intermediate vision, and near vision is the reciprocal when the respective distances from symbols Kf, Km, and Kn to symbols Tf, Tm, and Tn are expressed in meter units. Transmission sagittal power for distance vision, intermediate vision, and near vision is the reciprocal when the respective distances from symbols Kf, Km, and Kn to symbols Sf, Sm, and Sn are expressed in meter units. Transmission astigmatism for distance vision, intermediate vision, and near vision is the difference between each transmission meridional power and transmission sagittal power; reference power for distance vision, intermediate vision, and near vision is the reciprocal when the respective distances from symbols Kf, Km, and Kn to symbols Rf, Rm, and Rn are expressed in meter units. The error of transmission average refractive power for distance vision, intermediate vision, and near vision is the remainder resulting from subtracting each reference power from each transmission meridional power and transmission sagittal power average power.

In FIG. 5, symbol 19 is a starting point of reckoning for focal point distance of transmitted light, centered on the center of rotation of the eye 10, consisting of a spherical face passing through the posterior vertex of the lens. Similarly, symbol 20 is an image face showing focal point location for reference power corresponding to distance vision, intermediate vision, and near vision (for the purposes of discussion, a spherical face form is shown, but in actual practice it will not be a single spherical face since each focal point distance is different).

FIGS. 1(A), (B), and (C) are all hyperopia corrective progressive-power lenses of refractive index n=1.71, distance-vision power S+2.25, addition 2.00 diopters. Here, FIG. (A) is a conventional example with a surface base curve of 6.25 diopters, wherein the principal sight line 100 is an umbilical curvature; the refractive power difference between meridional transmission refractive power 17 and sagittal transmission refractive power 18 (i.e., transmission astigmatism) and the difference between the average value of the two and the surface average refractive power 16 for the lens proper 1 (transmission average refractive power error curvature of field), while somewhat pronounced at the bottom of the near portion, are not a significant problem overall.

FIG. 1(B) is a conventional example wherein the base curve of FIG. (A) has simply been changed to 3.50 diopters, and has a flatter thinner form than FIG. (A). Meridional transmission refractive power 17 in the distance portion is high and displaced towards the right; transmission astigmatism and transmission average refractive power error are both worse. That is, simply flattening the base curve, while affording a thinner element, results in poorer optical qualities.

FIG. (C) shows implementation of the invention; transmission astigmatism in the distance portion is improved with the principal sight line rendered as a non-umbilical point line by correcting surface refractive power along the principal sight line 100 in FIG. (B). As a result of this correction, the cross section of the lens in FIG. (C) is flatter and thinner than the cross section of the lens in FIG. (B).

FIGS. 6, 7, and 8 are diagrams showing examples of curving form for the progressive face of progressive-power lenses shown in FIGS. 1(A), (B), and (C). Each gives morphology data for the progressive face of a progressive-power lens with distance-vision power: S +2.25, addition: 2.00 diopters; the meridional axis and sagittal axis show locations in the vertical direction and sideways direction of the lens viewed from the front, with the numerical data indicating height of the progressive face with respect to the thickness direction of the lens. In each case the unit is mm. The + on the sagittal axis indicates the nasal side and the − indicates the temporal side. FIG. 6 corresponds to FIG. 1(A) and is a conventional example wherein the base curve is 6.25 diopters; FIG. 7 corresponds to FIG. 1(B) and is a conventional example wherein the base curve is 3.50 diopters; and FIG. 8 corresponds to FIG. 1(C) and corresponds to an embodiment of the invention wherein the base curve is 3.50 diopters.

FIGS. 2(A), (B), and (C) are all myopia corrective progressive-power lenses of distance-vision power S −5.00, addition 2.00 diopters. Here, FIG. (A) is a conventional example with a surface base curve of 4.00 diopters, wherein the principal sight line 100 is an umbilical curvature; the refractive power difference between meridional transmission refractive power 17 and sagittal transmission refractive power 18 (i.e., transmission astigmatism) and the difference between the average value of the two and the surface average refractive power 16 for the lens proper 1 (transmission average refractive power error and curvature of field), while somewhat pronounced at the bottom of the near portion, are not a significant problem overall.

FIG. 2(B) is a conventional example wherein the base curve of FIG. (A) has simply been changed to 2.00 diopters, and has a flatter thinner form than FIG. (A). Meridional transmission refractive power 17 in the distance portion is high and displaced towards the left; transmission astigmatism and transmission average refractive power error are both worse. That is, simply flattening the base curve, while affording a thinner element, results in poorer optical qualities.

FIG. (C) shows implementation of the invention; transmission astigmatism in the distance portion is improved with the principal sight line rendered as a non-umbilical point line by correcting surface refractive power along the principal sight line 100 in FIG. (B). As a result of this correction, the cross section of the lens in FIG. (C) is flatter and thinner than the cross section of the lens in FIG. (B).

FIGS. 9, 10, and 11 are diagrams showing examples of curving form for the progressive face of progressive-power lenses shown in FIGS. 2(A), (B), and (C). Each gives morphology data for the progressive face of a progressive-power lens with distance-vision power: S −5.00, addition: 2.00 diopters; the meridional axis and sagittal axis show locations in the vertical direction and sideways direction of the lens viewed from the front, with the numerical data indicating height of the progressive face with respect to the thickness direction of the lens. In each case the unit is mm. The + on the sagittal axis indicates the nasal side and the − indicates the temporal side. FIG. 9 corresponds to FIG. 2(A) and is a conventional example wherein the base curve is 4.00 diopters; FIG. 10 corresponds to FIG. 2(B) and is a conventional example wherein the base curve is 2.00 diopters; and FIG. 11 corresponds to FIG. 2(C) and corresponds to an embodiment of the invention wherein the base curve is 2.00 diopters.

In the preceding embodiment, for hyperopic use (positive distance-vision power), transmission aberration in the distance portion is improved, whereas for myopic use (negative distance-vision power), transmission average refractive power error in the distance portion is improved. The reason for the different nature of the correction for hyperopic use and myopic use is that, for myopic use (negative distance-vision power), when correction is performed so as to minimize transmission astigmatism in the distance portion, (+) transmission average refractive power error (curvature of field) is produced in the distance portion and cannot be cancelled out by the accommodating power of the eye. Conversely, for hyperopic use (positive distance-vision power), improving transmission astigmatism in the distance portion results in (−) transmission average refractive power error (curvature of field) in the distance portion, which can be cancelled out by the accommodating power of the eye, albeit within limits.

EMBODIMENT 2

Figure 12:
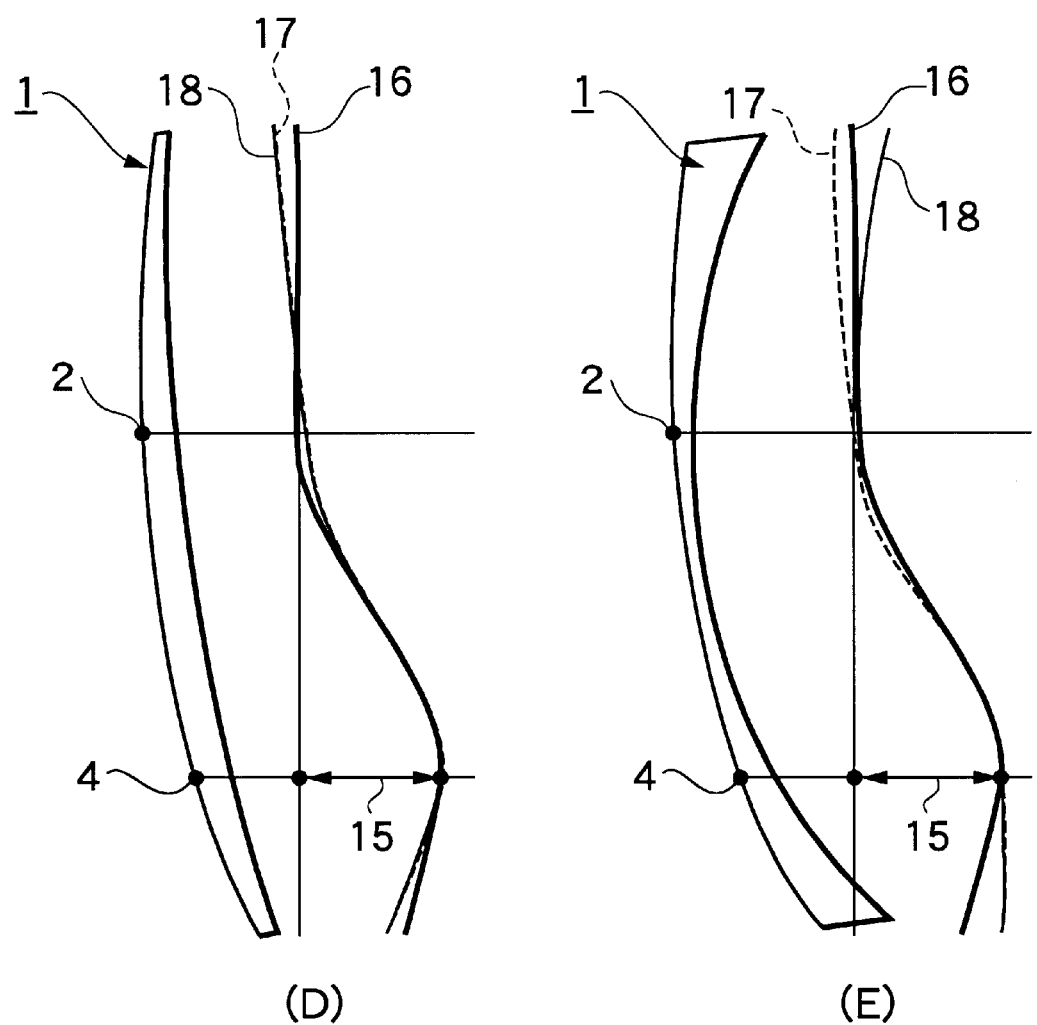
FIG. 12 is a diagram showing a curve of change in transmission refractive power on the principal sight line on the myopia corrective progressive-power lens of Embodiment 2.

FIG. 12 is a diagram showing a transmission refractive power distribution for a progressive-power lens pertaining to Embodiment 2 of the invention; FIG. 12(D) shows the case of correction for hyperopia and FIG. 12(E) shows the case of correction for myopia. The meanings of symbols, spectacle wear configuration, distance-vision power s, addition, base curve, and other elements in FIG. 12 are the same as in EMBODIMENT 1.

Referring to FIGS. (D) and (E), EMBODIMENT 2 differs from the preceding EMBODIMENT 1 in that correction is performed so as to minimize transmission astigmatism in the near portion, as will be apparent from the fact that there is no refractive power differential (transmission astigmatism) between meridional transmission refractive power 17 and sagittal transmission refractive power 18 in the near portion. That is, in addition to the elements of EMBODIMENT 1, EMBODIMENT 2 is additionally furnished with the element of elimination of transmission astigmatism in the near portion.

EMBODIMENT 3

Figure 13:
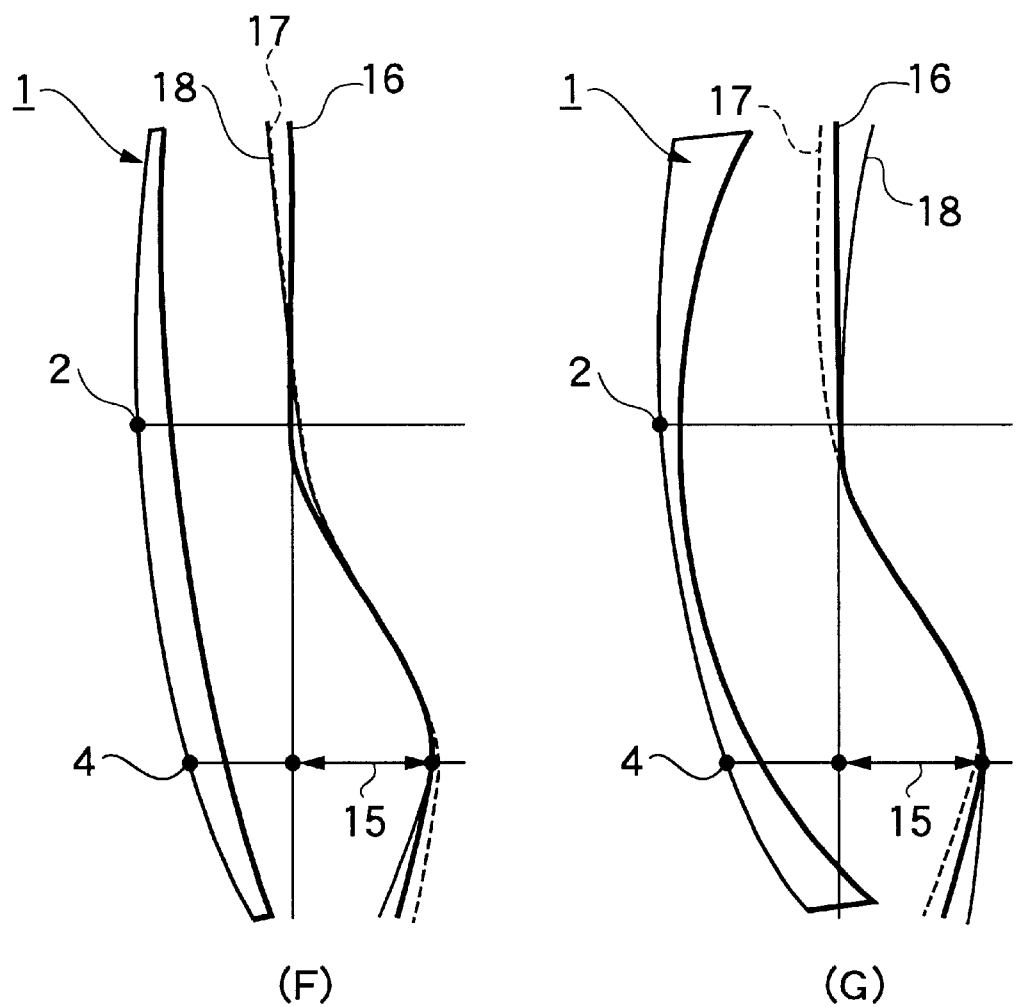
FIG. 13 is a diagram showing a curve of change in transmission refractive power on the principal sight line on the myopia corrective progressive-power lens of Embodiment 32.

FIG. 13 is a diagram showing a transmission refractive power distribution for a progressive-power lens pertaining to Embodiment 3 of the invention; FIG. 13(F) shows the case of correction for hyperopia and FIG. 13(G) shows the case of correction for myopia. The meanings of symbols, spectacle wear configuration, distance-vision power s, addition, base curve, and other elements in FIG. 13 are the same as in EMBODIMENT 1.

Referring to FIGS. (F) and (G), EMBODIMENT 3 differs from the preceding EMBODIMENT 1 in that correction is performed so as to minimize transmission average refractive power error (curvature of field) in the near portion, as will be seen from the fact that meridional transmission refractive power 17 and sagittal transmission refractive power 18 in the near portion are both approximately equally different from the surface average refractive power 16 of the lens body 1. That is, in addition to the characteristics of EMBODIMENT 1, EMBODIMENT 3 is additionally characterized in that the transmission average refractive power error (curvature of field) in the near portion has been eliminated.

EMBODIMENT 4

Figure 14:
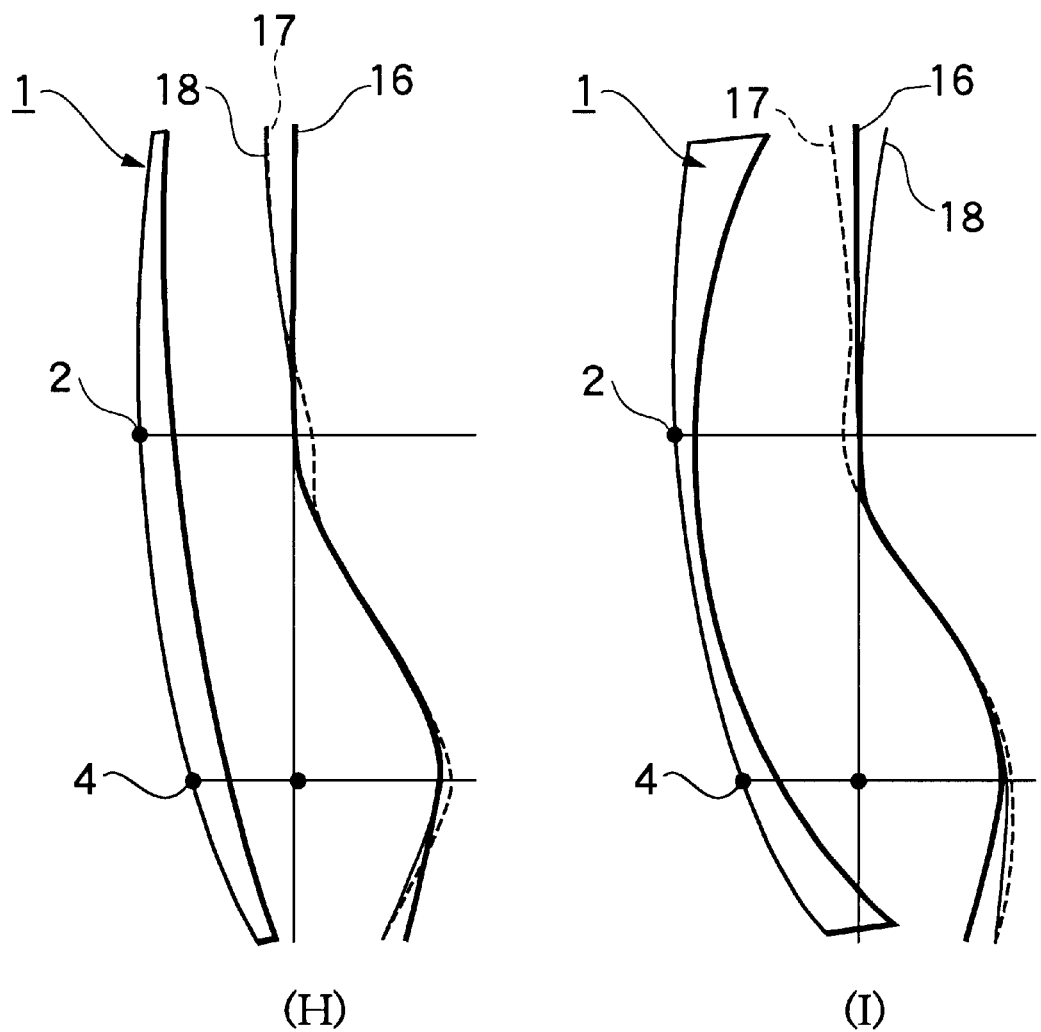
FIG. 14 is a diagram showing a curve of change in transmission refractive power on the principal sight line on the myopia corrective progressive-power lens of Embodiment 4.

FIG. 14 is a diagram showing a transmission refractive power for a progressive-power lens pertaining to Embodiment 4 of the invention; FIG. 14(H) shows the case of correction for hyperopia and FIG. 14(I) shows the case of correction for myopia. The meanings of symbols, spectacle wear configuration, distance-vision power s, addition, base curve, and other elements in FIG. 14 are the same as in EMBODIMENT 1.

Referring to FIGS. (H) and (I), EMBODIMENT 4 differs from the preceding EMBODIMENT 1 in that correction is not adequate in proximity to the far and near reference points, and meridional transmission refractive power 17 and sagittal transmission refractive power 18 diverge in localized fashion. That is, in addition to the elements of EMBODIMENT 1, EMBODIMENT 4 is additionally furnished with the element of complete elimination of transmission astigmatism in proximity to the far and near reference points.

Figure 15:
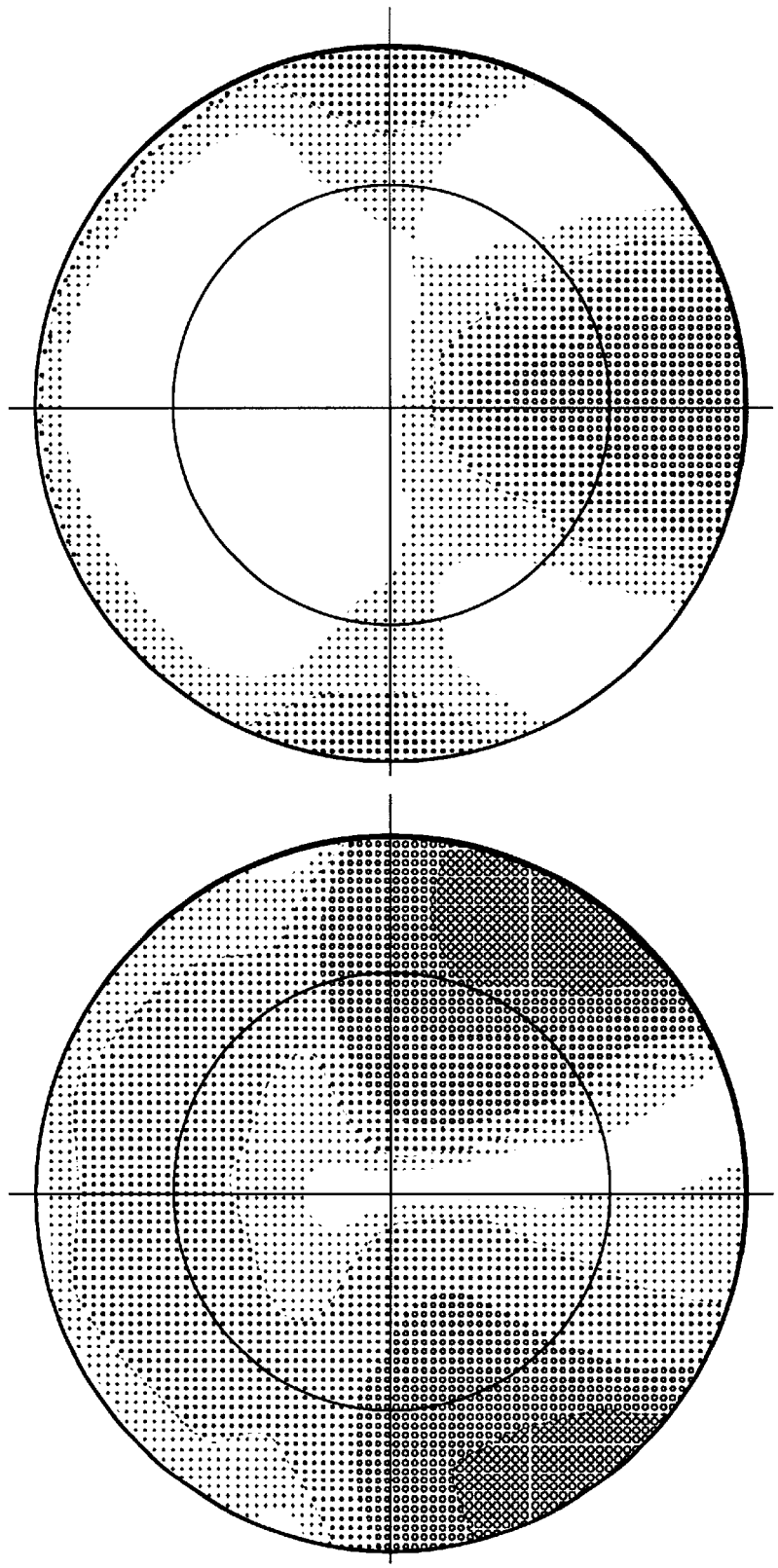
FIG. 15 is a diagram showing transmission astigmatism distribution and average refractive power in transmission distribution of the prior art.
Figure 16:
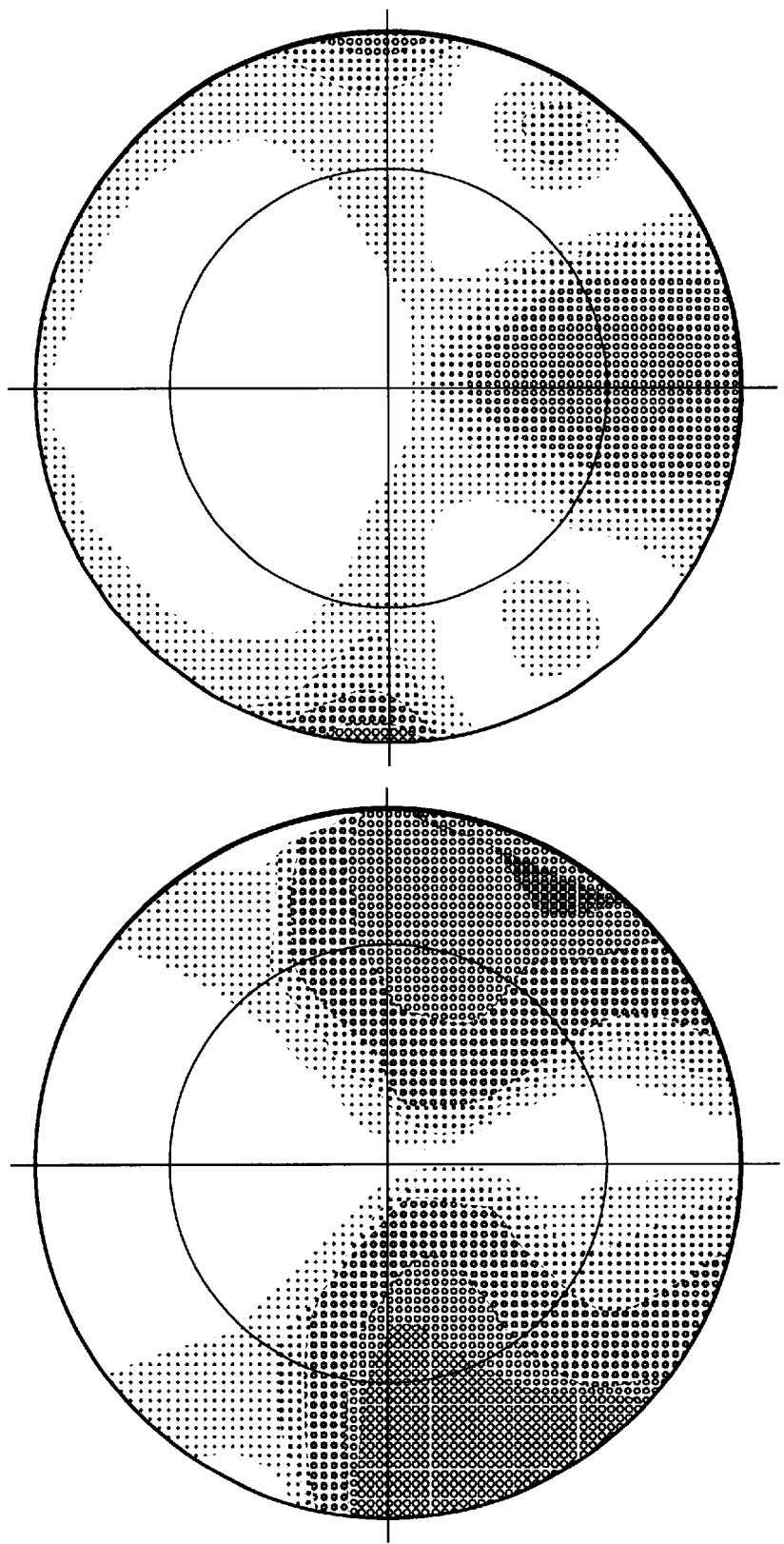
FIG. 16 is a diagram showing transmission astigmatism distribution and average refractive power in transmission distribution in an example wherein transmission astigmatism along the principal sight line has been completely eliminated.
Figure 17:
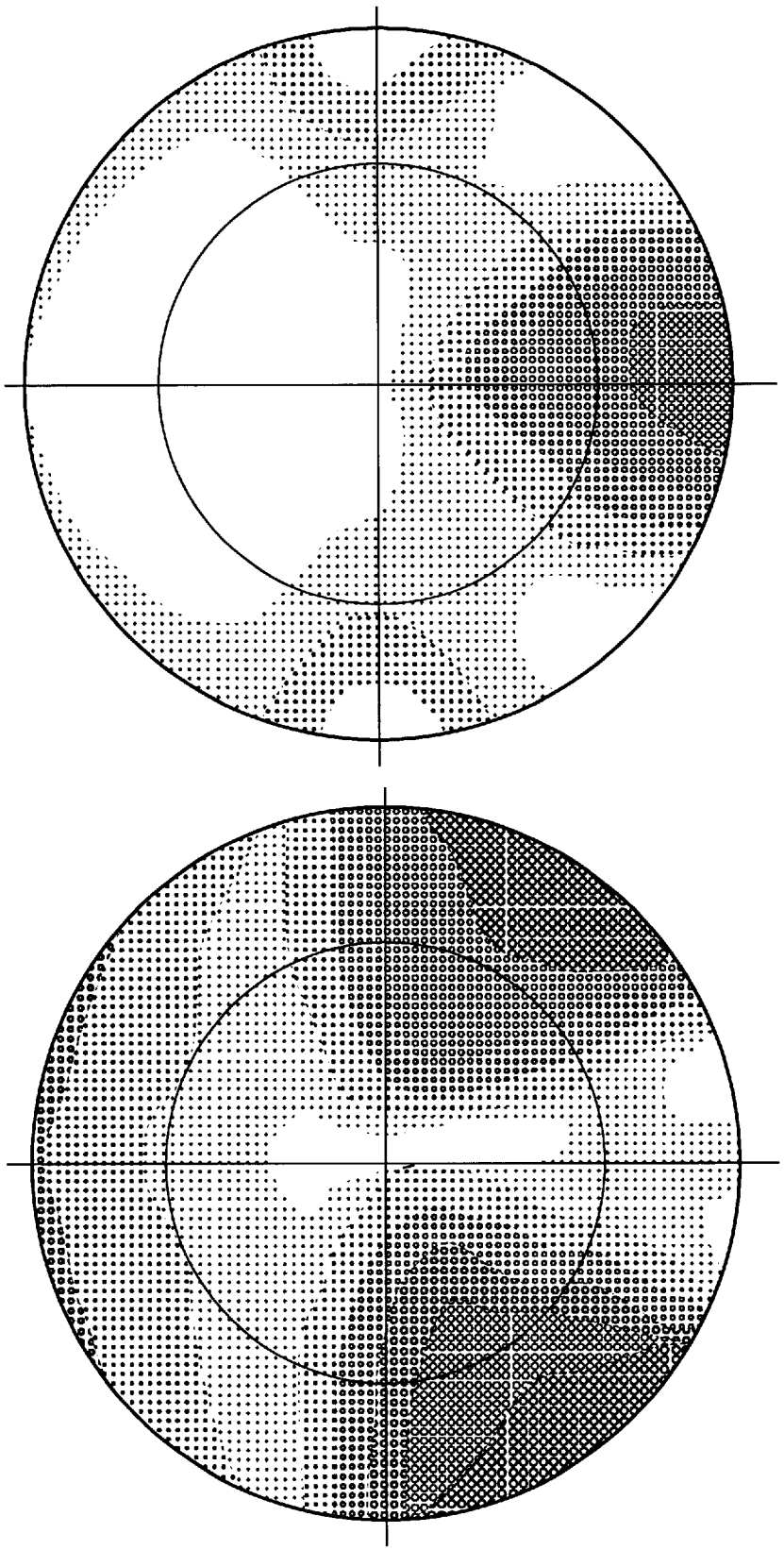
FIG. 17 is a diagram showing transmission astigmatism distribution and transmission average refractive power distribution of the lens pertaining to Embodiment 4 of the invention.

The case where transmission astigmatism in proximity to the far and near reference points has been completely corrected may be compared to the present embodiment, wherein it has not been completely corrected, making reference to transmission astigmatism distribution diagrams. FIG. 15 is a transmission astigmatism distribution diagram and transmission average power (refractive power) distribution diagram for FIG. 2(B), the prior art discussed earlier. Astigmatism and average power are shown in progressively darker color for each 0.50 diopter increase. In contrast, FIG. 16 is a transmission astigmatism distribution diagram and transmission average power (refractive power) distribution diagram for an example wherein transmission astigmatism has been completely corrected along the principal sight line. Representation of astigmatism and average power is the same as in FIG. 15. Similarly, FIG. 17 is a transmission astigmatism distribution diagram and transmission average power (refractive power) distribution diagram for EMBODIMENT 4 (corresponding to FIG. 14(I)), wherein correction is incomplete in proximity to the far and near reference points.

In the example shown in FIG. 15, the principal sight line is an umbilical curvature, so the transmission astigmatism distribution deteriorates. The example shown in FIG. 16 may at first glance appear better than the example shown in FIG. 17, in which correction is incomplete (50%), but from the broad lateral width of the low-aberration portion in proximity to the lens center and the low aberration corridor placement in the lens side zone it will be apparent that example shown in FIG. 17, which pertains to EMBODIMENT 4, is superior overall. This has been demonstrated through monitor tests involving actual wear of the lenses to evaluate wear comfort, which show that the lens of FIG. 17 is superior to the lens of FIG. 16.

The preceding discussion has assumed that the progressive face of the progressive-power lens of the invention is situated on the object side; however, the invention is not limited to this design, the category thereof including placement of the progressive face on the eyeball side (back side) as well.

A brief description is now given of the basic structural components of an optical design process for a progressive-power lens using a computer, used in the present embodiment.

First, reference progressive refractive faces are selected. In the lens design program, a convex face and a concave face of the reference progressive refracting surface s are set as functionalized faces via a predetermined equations, such that the prescription lens faces can be set by inputting predetermined form determining element parameters such as prescription power, etc. (Since lens design systems which express a lens face as a functionalized face and make use of programmed computers have become known, detailed description of the functionized faces in particular is deemed unnecessary for the purposes of the present embodiment.)

Further, for the reference progressive refracting surface thereof, a lens surface is set by determining the power distribution across an entire lens face of the distance portion, the intermediate portion, and the near portion. And then as elements for determining the power distribution thereof, there are the base curve value of the distance portion, addition, horizontal power distribution of the distance and near portions, the layout of the distance, near and intermediate portions, the power change distribution in progressive zone, the lay out of the principal meridian or principal sight line, the layout of astigmatism distribution, and the layout of average power distribution.

According to the present invention, optimization is then performed on this reference progressive refracting face in order to determine the final progressive-power lens faces.

First, a predetermined specific power is determined and design-related data is designated as design input data. On the basis of this input data, the spherical form of the lens is determined, and the optical characteristics of that lens are computed using a light ray tracing method. The light ray tracing method per se is known art and as such will not be discussed in detail; to give a brief description, however, according to the present embodiment, first, a starting point for light ray tracing is established as a rotation point. Then, points for performing light ray tracing are established over the entire lens face. A larger number of established points give higher precision of design; for example, about 3000–30000 points can be used for a typical spectacle lens. Then, projecting light rays at that established lens face location so as to pass through that rotation point and pass through the spectacle lens back face and front face, predetermined optical quantities (curvature of field, astigmatism, etc.) are computed for each light ray.

For example, where the portion is the near portion, an initial optical model for a wear condition is established based on distance of a predetermined near object (the target distance of near vision working: the distance to a working target which is located near) and right and left eye positions, VR value (distance from cycloduction to lens), distance PD, frame data and frame forward tilt angle, and light ray tracing computations are performed.

Then, the optical characteristics of that lens are evaluated through predetermined optical factors (for example, in the present embodiment, astigmatism, average refractive power error, etc.), and while manipulating various design factors on the basis of that result, candidates are selected. Repeating the above steps one by one until the candidate spherical form of the lens is decided to be employed, whereby optimization is performed to decide surface form (curve). According to the present embodiment, while performing lens portion specification (distance portion, near portion, etc.) and optical quantity specification (surface and transmission astigmatism, average refractive power error, etc.) particularly as design factors, an optimization calculation using a changing merit function of weighted optical quantities along the respective light rays is performed. Then when target design optical quantities are reached or surpassed, the optimization calculation is terminated.

That is, in optimization, on the basis of individual design ideas, these design factor elements are weighted and changed to decide upon the predetermined progressive refractive face form.

Further, according to the present embodiment, transmission astigmatism is corrected canceling out by providing the opposite astigmatism to the surface curve, while average refractive power error in transmission correction is correction by a method of increasing/decreasing average curve value per se.

Then, on the manufacturing side, to respond to prescription lens orders, progressive-power lenses created in this way are typically warehoused in the form of semi-finished lenses having a plurality of base curves (from 0 to 11 diopters, for example) for various prescription addition (ADD) (from 0.5 to 3.50 diopters, for example).

Next, an embodiment of a supply method for the progressive-power lens of the invention is described. Of course, the progressive-power lens of the invention is not limited to this method.

Figure 18:
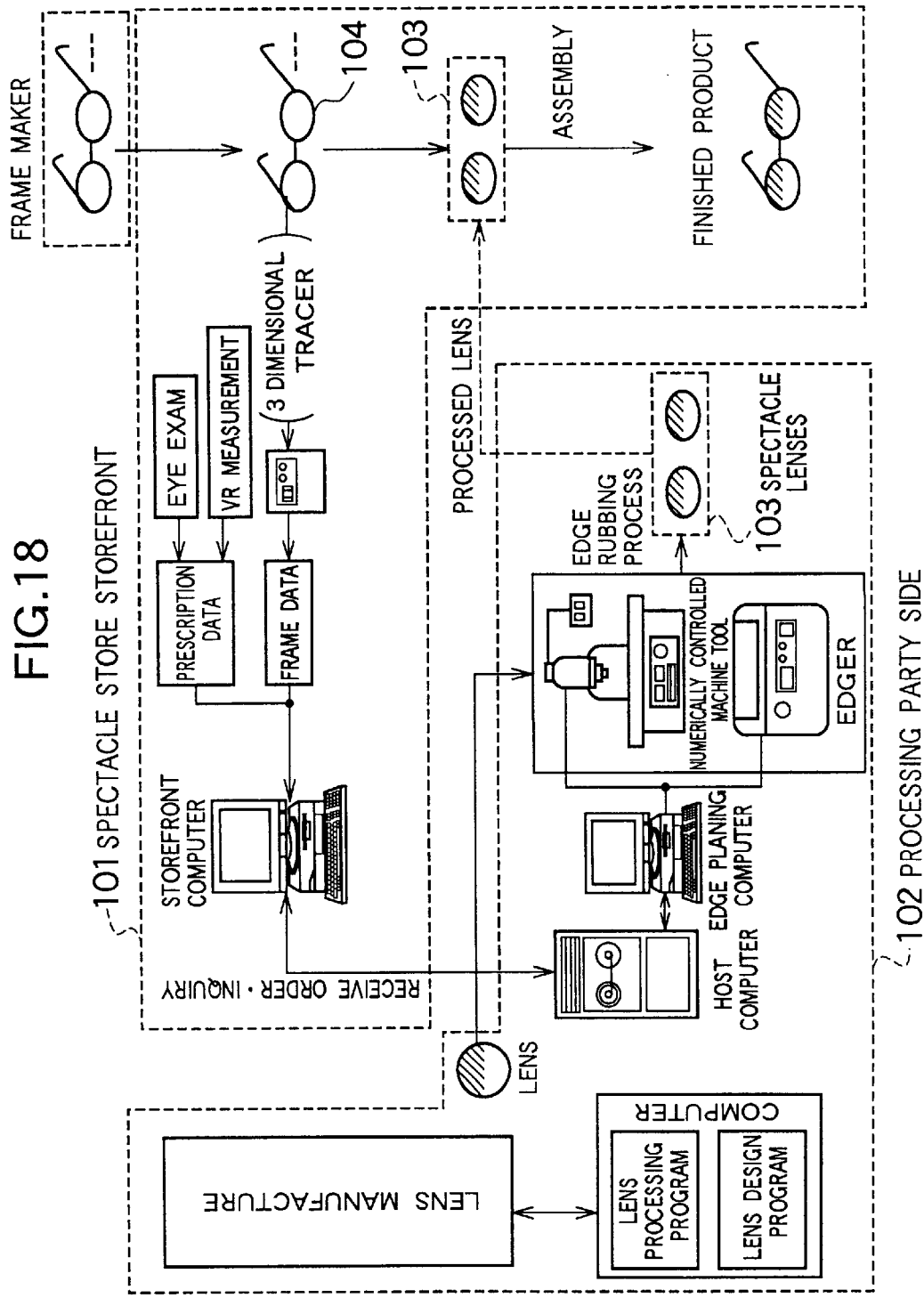
FIG. 18 is an illustrative diagram of the production process for the spectacle lens pertaining to an embodiment of the invention.
Figure 20:
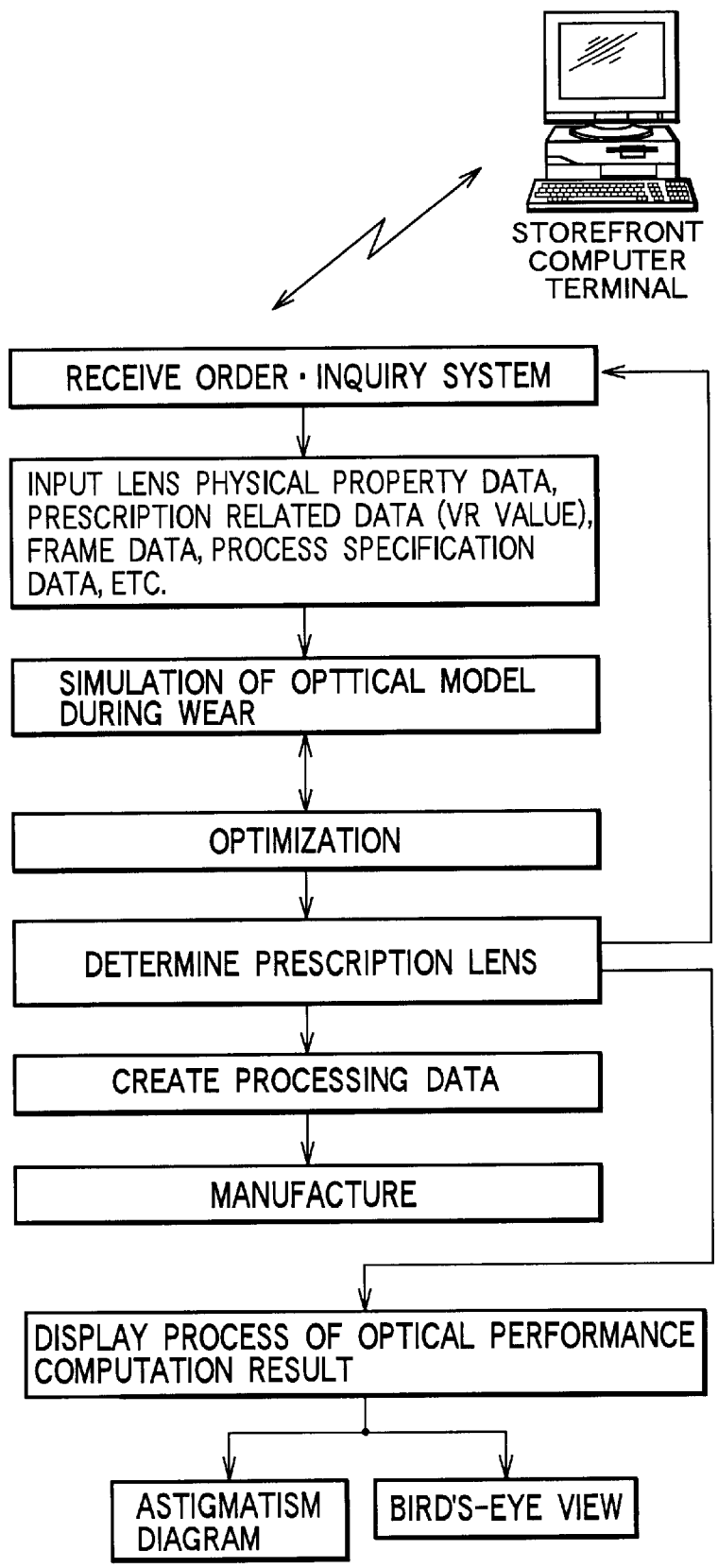
FIG. 20 is a flow chart of the production process for the spectacle lens.
Figure 21:
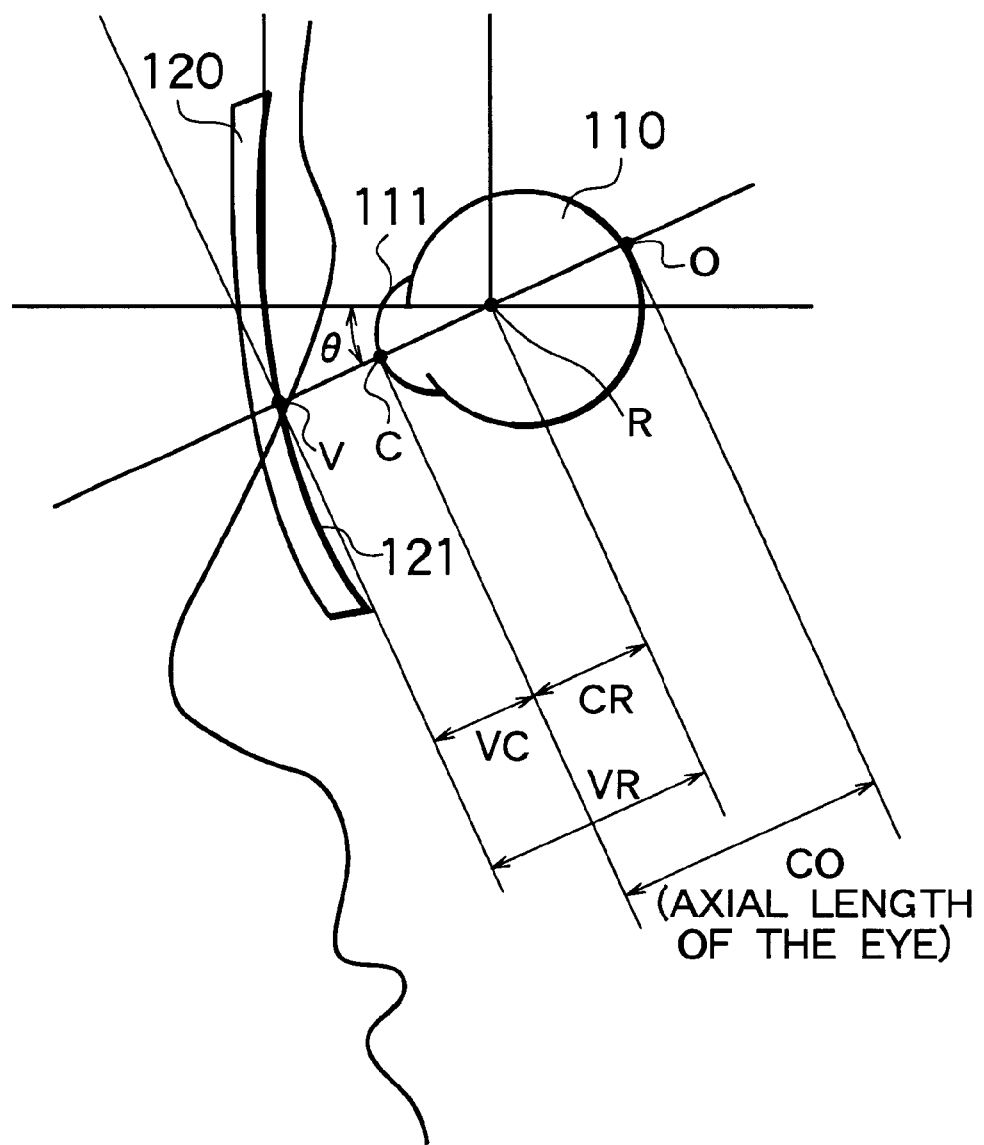
FIG. 21 is an illustrative diagram of an optical model of spectacle wear.

FIG. 18 is a schematic diagram of a supplying method of a spectacle lens related to an aspect of the embodiment of the present invention, FIG. 19 is a schematic diagram of an ordering screen, FIG. 20 is a flowchart of a manufacturing process of a spectacle lens, and FIG. 21 is a schematic diagram of an optical model of spectacles wearing.

In FIG. 18, symbol 101 is a spectacles store (ordering party), and symbol 102 is a spectacles processor (processing party). The spectacle lens supplying method of this aspect of the embodiment is such that a progressive multifocal lens 103 is designed and manufactured based on information sent via a terminal apparatus installed at the spectacles store (ordering party) 101 to an information processing system installed at the processor (processing party) 102.

That is, via the above-mentioned terminal apparatus there is sent to the above-mentioned information processing system processing condition data information selected as needed from among information comprising a prescription value, which comprises spectacle lens information, spectacle frame information, and data related to the individual VR value of a spectacles wearer, layout information, and process specification information. The above-mentioned information processing system determines processing conditions by processing the information thereof, and a spectacle lens is manufactured. These processes will be explained in detail hereinbelow. (Preparation of Prescription Data and Lens Data)

The preparation of prescription data and lens data for a spectacles wearer is performed at a spectacles store. Firstly, to determine a VR value for an individual, which is a characteristic of this aspect of the embodiment, a CR (distance from cycloduction point to cornea vertex of the eyeball) measuring apparatus is used to measure left eye and right eye CR values for each customer. However, in this aspect of the embodiment, as a simplified method, first, the axial length of the eye (distance from the vertex of the cornea to the intersection of the eye axis and the retina) of the left and right eyes, respectively, are measured using a popular commercial axial length (CO) measuring apparatus, and next, using a comparison coefficient of the relative location of the center of rotation of the eye (vertical direction) relative to the typical axial length of the eye, a CR value is computed via an operation, and this is used as the CR value for the left eye and right eye.

Next, the prescription is confirmed once again using either optometry data (spherical power, cylindrical power, cylinder axis, prismatic power, prism base setting, addition, distance PD, near PD, and so forth) from a customer's optometrist, or, as necessary, based on the optometry data thereof, using optometry equipment installed at a spectacles store. Then, lens data is prepared by making determinations based on interaction with the customer as to lens processing specification data, comprising the progressive-power lens power and type of lens material (glass, plastic), specification of surface processing options (tinting, wear-resistant coating (hard coating), antireflection coating, protection against ultraviolet rays, and so forth), center thickness, edge thickness, prism, and decentration, and layout specification data (for example, inward approach of specification, etc.). Further, type of lens, and surface processing options can be substituted for by specifying a lens maker specification, and the model name thereof.

(Preparation of Frame Data)

Next, the preparation of frame data is carried out. Frames supplied by a frame maker are stocked at a spectacles store 101, and a customer selects a frame 104 of his/her liking. At a spectacles store, shape measurements are taken for the selected frame thereof using an installed 3-dimensional frame shape measuring apparatus (for example, GT-1000, 3DFT by Hoya Corporation), and frame data (for example, shape, FPD, bridge, frame curve, rim thickness, frame material, type (full frame, rimron, rimless), and so forth) is prepared.

However, the notation method for acquisition of frame data differs for each frame maker, and there are also various acquisition methods. The above-mentioned method indicated a method by which an actual frame shape is measured, but a method, in which information is already attached to a frame beforehand as a shape data barcode tag, acquires frame data by reading the data thereof. Further, in a case in which all frame data can be extracted from a frame model, frame data is extracted from the model data thereof.

Next, taking into consideration the actual shape of the head of a customer, lens data, frame shape characteristics, and wearing conditions, the frame tilt angle is determined, and the distance between the vertex of the cornea of the eye and the concave surface of a lens (VC value) is determined. A VR value is determined from the sum of this VC value and the CR value determined above.

(Data Communications Between Spectacles Store and Lens Maker Via Personal Computer)

Next, data communications are carried out with a host computer at a lens maker using a personal computer (terminal) installed at an outlet of a spectacles store. A spectacle lens ordering and inquiries system, which is ordinarily utilized in the spectacles industry (for example, a typical system is the Hoya Online System manufactured by Hoya Corporation), can be used in the data communications thereof. To send to a host computer the various information necessary to design and manufacture a spectacles lens required by the above-mentioned spectacles store, this data communications is performed using a predetermined ordering screen. FIG. 19 is the system ordering screen thereof. Various information, comprising a VR value, is sent to a host computer via the ordering screen.

(Design and Manufacture)

At the plant side (processing party), a host computer inputs and processes the various information sent from the above-mentioned terminal, and determines the prescription lens. FIG. 20 is a flowchart of a spectacle lens manufacturing process, and is a diagram showing a process, comprising simulation up until the manufacture of a prescription lens thereof.

In FIG. 20, first prescribed input items are checked. In the data sent from the above-mentioned spectacles store, the main items thereof, which are related to optical lens design, are physical lens data (refractive index, Abbe number, 1specific gravity, and so forth), prescription-related data (lens power, cylinder axis, addition, prismatic power, prism base setting, decentration, outer diameter, distance PD, near PD, lens thickness, VR value (CR value+VC value)), frame data (shape, DBL, FPD, frame curve, and so forth), frame forward tilt, type of bevel, and other process specification data. As for lens data and frame data in particular, it is desirable to acquire basic physical and design data from a manufacturer beforehand.

And then, a spectacles wearing optical model is comprehensively simulated from the data thereof. FIG. 21 is a schematic diagram of an optical model of spectacles wearing, and is a diagram, which partially shows an outline of an optical model from the side. As shown in FIG. 21, a lens is positioned in front of the eye by estimating a frame forward tilt angle θ. In this case, the VR value is the sum of the distance from the center of rotation R of the eye 110 to the vertex C of the cornea 111, that is, the CR value, and the distance from the vertex of the cornea C to a reference point V on the back surface 121 of a lens 120 (point of intersection of an extension of a straight line CR and a lens back surface 121) (VC value). In particular, if factors affecting the VR value, such as the improved physical constitution of spectacles wearers in recent years, differences in the skeletal structures of individuals, differences in the shape of the eye, and the enlargement and diversification of frames, are also added, it has been ascertained via studies that the VR value is considerably broad, and in general is estimated to range from roughly 15 millimeters to around 44 millimeters. In FIG. 21, θ is the point of intersection of the eye axis and the retina.

Next, by computing with a computer a lens design program containing a database of the progressive-power lens design of the invention, the final concave and convex face forms and lens thickness are determined, and a prescribed progressive-power lens is determined. While there are design methods employing individual VR values as described above, there are also design methods that do not employ individual data but rather use average VR values; the invention is not limited to one or the other.

(Lens Manufacture)

Next, once the order for a progressive-power lens of the aforementioned prescription has been made, processing data is created. This processing data is created on the basis of a previously created lens processing program for the progressive-power lens of the invention, and determines processing conditions for the processing apparatus, controls drive, selects processing tools, indicates lens material selection, etc., and issues a processing specification document while transmitting processing data for the processing apparatus to various production apparatuses at the plant.

Then, at the plant, the processing specification document is used as the basis for selecting a semi-finished lens having the prescribed base curve, and lens processing buy cutting and grinding with an NC cutting apparatus is performed. Surface treatments (abrasion resistant hard coating film formation, antireflective film formation, lens tinting, water repellency treatment, ultraviolet blocking film formation, anti-fog treatment, etc.) are performed as well where required. This gives a completed prescription lens of circular form condition.

Next, with reference to predetermined frame shape, the circular lens is subjected to bevel processing by edge planing on the basis of spectacle layout information. Bevel processing is performed by a machining center. This processing may be accomplished using the tools and processing methods disclosed in the Applicant's copending Utility Model Application Laid-Open H6-17853 and Patent Application Laid-Open H6-34923 pertaining to the application cited at left. Here as well, using processing conditions include lens material (glass, plastic, polycarbonate, acrylic, etc.) selection, frame material selection, frame PD (FPD, DBL) input, PD (both eyes, one eye) input, horizontal eccentricity X input, vertical eccentricity Y input, cylinder axis input, finish size input, bevel specification, etc., during setting of processing mode, the input data can be introduced automatically by the program.

Next, the prescribed items are set and the apparatus is driven, whereby edging and bevel processing are performed automatically at the same time. In this way, bevel lenses are manufactured, and at the plant, are inspected and then shipped to the spectacle store. At the spectacle store, the bevel lenses are fitted in the selected spectacle frame to assemble the spectacles. In the present embodiment, bevel processing is performed by the manufacturing manufacturer, but this may be performed at the spectacle store, so the manufacturing flow of the present embodiment is not limited.

INDUSTRIAL APPLICABILITY

By means of the constitution described herein, it is possible to provide a progressive-power lens of superior wear comfort, even with a shallow base curve to make it thinner and lighter.

What is claimed is:

1. Progressive-power lens groups comprising at least one group for correcting hyperopia and at least one group for correcting myopia wherein for each lens of the lens groups, said lens comprises:

a distance portion formed in the upper region of the lens; a near portion formed in the lower region of the lens; and an intermediate portion formed in an intermediate region between said distance portion and near portion; said lens having a refractive power distribution in which the refractive power of each portion changes progressively going from said distance portion through the intermediate portion to the near portion along a principal sight line that is a center reference line dividing the lens into substantially left and right portions; and said lens having a predetermined range of addition;

and said distance portion corresponding to the prescription for correcting hyperopia or that for correcting myopia, wherein:

when said lens is for correcting hyperopia, said distance portion has a positive refractive power, and correction is made by optimizing transmission astigmatism parameters so as to minimize the transmission astigmatism at each point on said principal sight line; and when said lens is for correcting myopia, said distance portion has a negative refractive power, and correction is made by optimizing transmission average refractive power error parameters so as to minimize the transmission average refractive power error at each point on said principal sight line.

2. The progressive-power lens groups according to claim 1, wherein for each hyperopia correcting lens the transmission astigmatism is minimized at each point on the principal sight line of said near portion by optimizing transmission astigmatism parameters.

3. The progressive-power lens groups according to claim 1, wherein for each myopia correcting lens the transmission average refractive power error is minimized at each point on the principal sight line of said near portion by optimizing transmission average refractive power error parameters.

4. The progressive-power lens groups according to claim 1, wherein no such correction is made that the transmission astigmatism is zero at either the distance reference point or the near reference point, or at both points.

5. A method for designing a progressive-power lens groups comprising at least one group for correcting hyperopia and at least one group for correcting myopia wherein for each lens of the lens groups, said lens comprises:

a distance portion formed in the upper region of the lens; a near portion formed in the lower region of the lens; and an intermediate portion formed in an intermediate region between said distance portion and near portion; said lens having a refractive power distribution in which the refractive power of each portion changes progressively going from said distance portion through the intermediate portion to the near portion along a principal sight line that is a center reference line dividing the lens into substantially left and right portions; and said lens having a predetermined range of addition; and said distance portion corresponding to the prescription for correcting hyperopia or that for correcting myopia, wherein:

when said lens is for correcting hyperopia, said distance portion has a positive refractive power, and correction is made by optimizing transmission astigmatism parameters so as to minimize the transmission astigmatism at each point on said principal sight line; and when said lens is for correcting myopia, said distance portion has a negative refractive power, and correction is made by optimizing transmission average refractive power error parameters so as to minimize the transmission average refractive power error at each point on said principal sight line.

6. A method for designing the progressive-power lens groups according to claim 5, wherein for each hyperopia correcting lens the transmission astigmatism is minimized at each point on the principal sight line of said near portion by optimizing transmission astigmatism parameters.

7. A method for designing the progressive-power lens groups according to claim 5, wherein for each myopia correcting lens the transmission average refractive power error is minimized at each point on the principal sight line of said near portion by optimizing transmission average refractive power error parameters.

8. A method for designing the progressive-power lens groups according to claim 5, wherein no such correction is made that the transmission astigmatism is zero at either the distance reference point or the near reference point, or at both points.

9. The progressive-power lens groups according to claim 2, wherein no such correction is made that the transmission astigmatism is zero at either the distance reference point or the near reference point, or at both points.

10. The progressive-power lens groups according to claim 3, wherein no such correction is made that the transmission astigmatism is zero at either the distance reference point or the near reference point, or at both points.

11. A method for designing the progressive-power lens groups according to claim 6, wherein no such correction is made that the transmission astigmatism is zero at either the distance reference point or the near reference point, or at both points.

12. A method for designing the progressive-power lens groups according to claim 7, wherein no such correction is made that the transmission astigmatism is zero at either the distance reference point or the near reference point, or at both points.

13. A progressive-power lens for correcting myopia comprising a distance portion formed in the upper region of the lens; a near portion formed in the lower region of the lens; and an intermediate portion formed in an intermediate region between said distance portion and near portion; said lens having a refractive power distribution in which the refractive power of each portion changes progressively going from said distance portion through the intermediate portion to the near portion along a principal sight line that is a center reference line dividing the lens into substantially left and right portions; and said lens having a predetermined range of addition, and said distance portion corresponding to the prescription for correcting myopia, wherein:

correction is made by optimizing transmission average refractive power error parameters so as to minimize the transmission average refractive power error at each point on said principal sight line.

14. A method for designing a progressive-power lens for correcting myopia comprising a distance portion formed in the upper region of the lens; a near portion formed in the lower region of the lens; and an intermediate portion formed in an intermediate region between said distance portion and near portion; said lens having a refractive power distribution in which the refractive power of each portion changes progressively going from said distance portion through the intermediate portion to the near portion along a principal sight line that is a center reference line dividing the lens into substantially left and right portions; and said lens having a predetermined range of addition, and said distance portion corresponding to the prescription for correcting myopia, wherein:

correction is made by optimizing transmission average refractive power error parameters so as to minimize the transmission average refractive power error at each point on said principal sight line.

* * * * *